(12) United States Patent
Walch

(10) Patent No.: US 8,452,108 B2
(45) Date of Patent: May 28, 2013

(54) SYSTEMS AND METHODS FOR IMAGE RECOGNITION USING GRAPH-BASED PATTERN MATCHING

(75) Inventor: Mark A. Walch, Woodbridge, VA (US)

(73) Assignee: Gannon Technologies Group LLC, McLean, VA (US)

( * ) Notice: Subject to any disclaimer, the term of this patent is extended or adjusted under 35 U.S.C. 154(b) by 916 days.

(21) Appl. No.: 12/492,111

(22) Filed: Jun. 25, 2009

(65) Prior Publication Data

US 2009/0324107 A1   Dec. 31, 2009

Related U.S. Application Data

(60) Provisional application No. 61/075,639, filed on Jun. 25, 2008.

(51) Int. Cl.
*G06K 9/62* (2006.01)

(52) U.S. Cl.
USPC .......................................................... 382/203

(58) Field of Classification Search
None
See application file for complete search history.

(56) References Cited

U.S. PATENT DOCUMENTS

| | | | |
|---|---|---|---|
| 4,961,231 A | 10/1990 | Nakayama et al. |
| 5,267,332 A | 11/1993 | Walch et al. |
| 5,519,786 A | 5/1996 | Courtney et al. |
| 5,559,895 A | 9/1996 | Lee et al. |
| 5,719,959 A | 2/1998 | Krtolica |
| 5,745,600 A | 4/1998 | Chen et al. |
| 5,854,853 A | 12/1998 | Wang |
| 5,854,855 A | 12/1998 | Errico et al. |
| 5,923,793 A | 7/1999 | Ikebata et al. |
| 5,930,380 A | 7/1999 | Kashi et al. |
| 5,940,535 A | 8/1999 | Huang |
| 5,953,451 A | 9/1999 | Syeda-Mahmood |
| 6,011,537 A | 1/2000 | Slotznick |
| 6,108,444 A | 8/2000 | Syeda-Mahmood |
| 6,445,820 B1 | 9/2002 | Love |
| 6,556,712 B1 | 4/2003 | Loudon et al. |
| 7,240,062 B2 | 7/2007 | Andersen et al. |
| 7,362,901 B2 | 4/2008 | Walch |
| 2004/0165777 A1 | 8/2004 | Losev et al. |
| 2005/0015240 A1 | 1/2005 | Appleby |
| 2005/0074169 A1 | 4/2005 | Filatov et al. |
| 2006/0269167 A1 * | 11/2006 | Venkatesan et al. .......... 382/305 |
| 2007/0172132 A1 | 7/2007 | Walch |
| 2008/0247674 A1 | 10/2008 | Walch |

FOREIGN PATENT DOCUMENTS

WO       2004079526       9/2004

OTHER PUBLICATIONS

Dehghan, M. "Signature Verification Using Shape Descriptors and Multiple Neutral Networks," IEEE Tencon 96, 02, Dec. 1997, vol. 1, pp. 415-418.
International Search Report for PCT/US04/29091.

(Continued)

*Primary Examiner* — Brian P Werner
(74) *Attorney, Agent, or Firm* — Procopio, Cory, Hargreaves & Savitch LLP; Noel C. Gillespie

(57) ABSTRACT

A method for creating a modeling structure for classifying objects in an image comprises converting an image into digital image data; using a processor, simplifying the digital image data; using the processor, isolating objects in the simplified digital image data; using the processor, creating graphs of the isolated objects, the graphs comprising vertices and edges; using the processor, converting the graphs into representative graph data structures, the graph data structures comprising a database key based on the vertices and edges.

24 Claims, 21 Drawing Sheets

OTHER PUBLICATIONS

International Search Report for PCT/US2004/006173 dated Dec. 11, 2008.

International Search Report and Written Opinion related to PCT/US07/60238 mailed Feb. 15, 2008.

* cited by examiner

2;192

4;112.0

4;98.0.64

4;112.0

4;98.0.64

 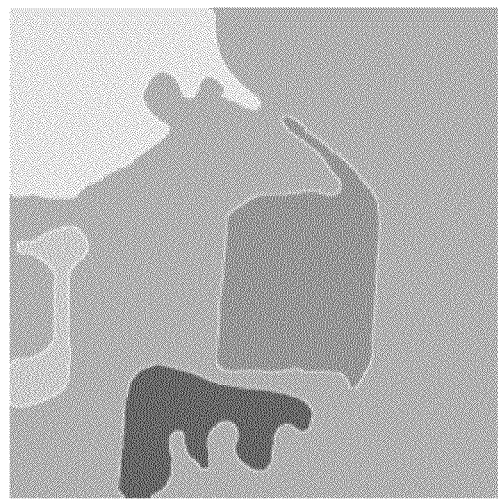
FIG. 13A                    FIG. 13B

SYSTEMS AND METHODS FOR IMAGE RECOGNITION USING GRAPH-BASED PATTERN MATCHING

RELATED APPLICATION INFORMATION

This application claims priority under 35 U.S.C. 119(e) to U.S. Provisional Application Ser. No. 61/075,639, entitled "Systems and Methods for Image Recognition Using Graph-Based Pattern Matching," filed Jun. 25, 2008, which is incorporated herein by reference in its entirety as if set forth in full.

This Application is also related to U.S. patent application Ser. No. 11/621,000, entitled Pictographic Recognition Technology Applied to Distinctive Characteristics of Handwritten Arabic Text," filed Jan. 8, 2007, which is also incorporated herein by reference in its entirety as if set forth in full.

BACKGROUND

1. Technical Field

The embodiments disclosed in this application generally relate to Graph-Theory based pattern recognition technologies used for recognizing objects such as images.

2. Background

Pictographic Recognition (PR) technology is a term used herein to describe a Graph-Theory based method for locating specific words or groups of words within handwritten and machine printed document collections. This technique converts written and printed text forms into mathematical graphs and draws upon certain features of the graphs (e.g., topology, geometric features, etc.) to locate graphs of interest based upon specified search terms or to convert the graphs into text.

PR has been successfully used in the past as a search and recognition tool by identifying individual characters in strings of cursive handwritten English and Arabic script. However, the free flowing structure of handwritten text, especially Arabic, has posed some unique challenges for PR-based methodologies. First, Arabic is written in a cursive form so there is no clear separation between characters within words. Often, writers take considerable license in writing Arabic strings so that characters are either skipped or highly stylized. This makes it difficult to parse the string automatically into separate characters and to identify the individual characters within an Arabic word using computer-based recognition methodologies. Second, Arabic characters change their form depending on their word position (e.g., initial, middle, final, standalone, etc.). Third, Arabic words incorporate external characteristics such as diacritical markings. Lastly, Arabic writers often add a second "dimension" to writing by stacking characters on top of each other and the Arabic language is heavily reliant on ligatures (i.e., multiple characters combined into a single form) All these characteristics contribute to considerable dissimilarities between handwritten and machine printed forms of Arabic.

These dissimilarities make it difficult to achieve satisfactory results using existing PR techniques. Moreover, there is little or no ability to extend such techniques to, e.g., images. This is primarily because it is very difficult using conventional techniques to convert an image into a suitable graph. This is because satellite imagery, photographs, and other types of remote sensing images rarely surrender their information readily to computer algorithms. The information usually has to be coaxed out of the images through a sophisticated series of processing steps. By their nature, these images contain background clutter and superfluous information, atmospheric effect, and many other flaws that degrade the image quality or create a confusing "field" of information surrounding an object of interest. Often, these defects must first be eliminated—or, at least attenuated—before objects of interest within the images can be detected, extracted, and/or identified. Or, a method must be applied that can distinguish items of interest within noisy backgrounds and "surgically" extract them from their surroundings.

The practice of imagery analysis dates back to the dawn of aerial reconnaissance during World War I. Although new technologies such as multi-spectral imagery have been perfected and numerous image analysis techniques have been developed during the intervening years, image understanding remains firmly in the domain of human experts to this day. The expert must still sift through exceedingly large amounts of data, before he is able to employ the full power of his modern tools to the problem.

Some of the most successful approaches of image content analysis rely heavily on human judgment. One such approach requires the human expert to analyze an image and annotate and extract the key features from it in accordance with his interests and skills. This method came to the fore during World War II and the early part of the Cold War. While it met the needs of its users, it is labor-intensive, expensive, error-prone, and inefficient.

Another, more modern, approach is the one adopted by the current crop of web search engines. This method relies on the textual information that was inserted into the images by its creators. It is highly effective and requires no new technologies, since it leverages the power of the text search engine; however, such techniques rely implicitly on the judgment of the content creators. If the images were tagged with incorrect or incomplete textual information, the results are entirely useless. And, such methods cannot handle untagged images.

A similar but slightly more sophisticated approach examines not only the image tags, but also the text that surrounds the image in a document, as well as the text surrounding the URL in other documents that link to this image. Such approaches also suffer from the common ailment as the tag-based approach, because the results are entirely dependent on the content creators' judgments.

Content-based image retrieval methods and systems employ algorithms that actually analyze the content of the image. Some of the well-known content-based image retrieval systems use a combination of simple ideas including color histograms, Gaussian descriptors, Fourier descriptors, and wavelet signatures. In spite of their higher level of sophistication, however, these techniques typically cannot handle the rich set of low-level structural details, due to the fact that they work only with abstract feature sets such as color blobs, shape edges, and straight lines of specific orientations.

The biometric face identification (facial recognition) systems employ some of the most complex techniques capable of dealing with the minute, detailed features of the human face. Thought highly sophisticated, these techniques cannot cope adequately with background clutter, poor lighting, partial occlusion, and angular distortions.

In sum, the existing techniques for recognizing objects within imagery and for comparing and searching images are limited by the nature of the feature sets they employ and the levels of abstraction they apply to those feature sets. Images by nature present feature vectors of very high dimensionality requiring solutions that reduce feature dimensions down to manageable size. Often this requires substantial amount of abstraction computations. For instance, such abstraction can involve distilling the content of the image into a distribution of pixel colors, edge crossings or similar measures that yield very efficient computations, but sacrifice large amounts of significant information.

SUMMARY

A process for isolating objects in an image and creating a graph representative of the object that can, e.g., be used to identify the same object in other images is described herein.

According to one aspect, a method for creating a modeling structure for classifying objects in an image comprises converting an image into digital image data; using a processor, simplifying the digital image data; using the processor, isolating objects in the simplified digital image data; using the processor, creating graphs of the isolated objects, the graphs comprising vertices and edges; using the processor, converting the graphs into representative graph data structures, the graph data structures comprising a database key based on the vertices and edges.

According to another aspect, A system for creating a modeling structure for classifying objects in an image comprises a database; an image input interface configured to provide digital image data; and a processor coupled with the database and the image input interface, the processor configured to: simplify the digital image data, isolate objects in the simplified digital image data, create graphs of the isolated objects, the graphs comprising vertices and edges, convert the graphs into representative graph data structures, the graph data structures comprising a database key based on the vertices and edges.

These and other features and aspects will be described in more detail in the section entitled "Detailed Description."

BRIEF DESCRIPTION OF THE DRAWINGS

For a more complete understanding of the principles disclosed herein, and the advantages thereof, reference is now made to the following descriptions taken in conjunction with the accompanying drawings, in which:

FIGS. 13A and 13B illustrate the result of preprocessing steps that can be included in the method of FIG. 12 on an image;

DETAILED DESCRIPTION

Systems and methods for image recognition using graph-based pattern matching are disclosed. It will be apparent that the systems and methods describe herein can be practiced without some or all of these specific details. In other instances, well known process operations have not been described in detail in order not to unnecessarily obscure the description of the embodiments described herein.

Before looking at image recognition, a graph based approach to handwritten text previously described in U.S. patent application Ser. No. 11/621,000 will be described in order to explain the graph based techniques that can be applied to image recognition.

First, analyzing, e.g., Arabic text as individual multi-character clusters (i.e. "parts of Arabic words" or "PAWs") addresses many of the above mentioned challenges. PAWs occur because of natural breaks in Arabic words caused by certain characters which do not connect with characters that follow them. In other words, PAWs are the byproduct of natural intra-word segmentation that is an intrinsic property of Arabic. PAWs create an opportunity to focus on these "self-segmented" character strings within Arabic words and it is possible to treat the individual PAWs as if they were individual characters for recognition purposes. Therefore, the PR-based methods described herein are well suited to treat groups of characters as "word segments" and thus greatly enhance the task of locating and identifying full words within complex handwritten text (e.g., Arabic, etc.) that is cursive (connected), highly stylized and heavily reliant on ligatures.

Figure 1:
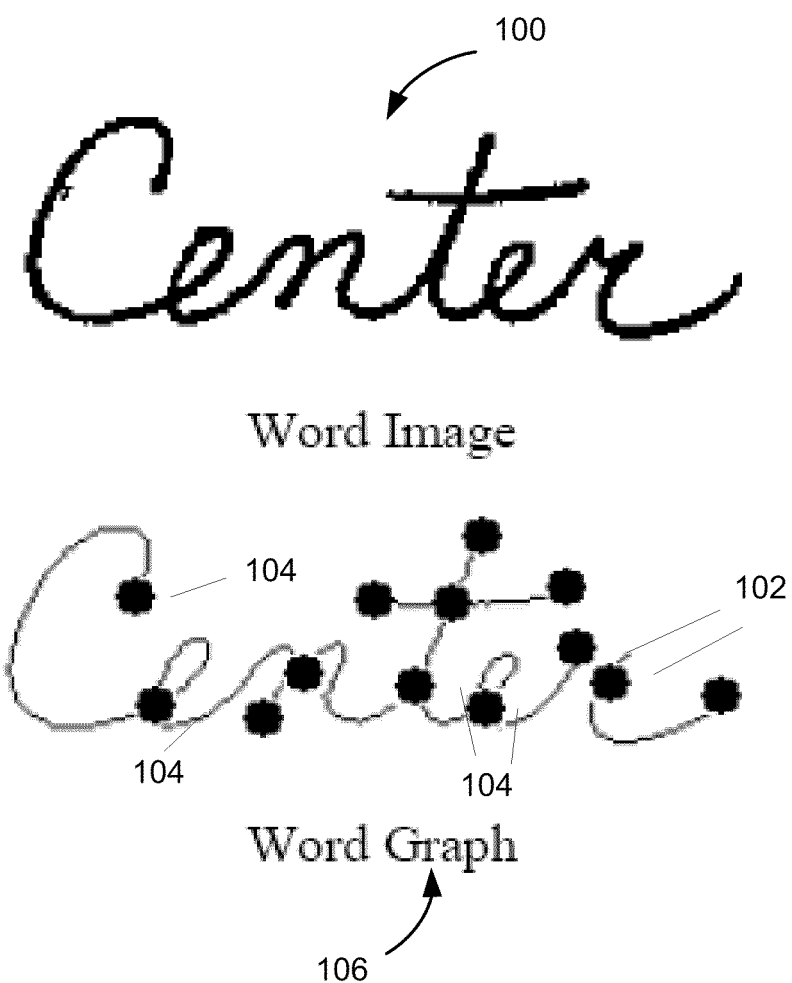
FIG. 1 is an illustration of the handwritten and graph forms of the word "Center", in accordance with one embodiment.

As used herein, Graph Theory is a branch of mathematics that focuses on representing relationships as line diagrams containing nodal points and linkages among these points. As shown in FIG. 1, a graph 106 constructed in accordance with the systems and methods described herein can be comprised of multiple nodal points 102 and linkages 104. Nodal points 102 (also known as vertices) are points at which strokes cross and linkages 104 (also known as edges) are the actual strokes that comprise the word 100. In all written language, graphs offer direct means of capturing the essence of the written form. The graph 106 can be used to convert all the information extracted from the word 100 into a concise mathematical format that is highly computable. In one embodiment, the word 100 can be an Arabic word. In another embodiment, the word 100 can be an English word. It should be appreciated that the word 100 can be in any language as long as the words 100 written in the language can be processed using Graph Theory into a graphic form that captures nodal point 102, linkage 104 and vector feature information unique to the word 100. The extensibility of the methods herein described to all written language results from the common origin of writing systems as shapes inscribed as line forms.

Within the graph 106, the connectivity among the nodal points 102 and linkages 104 comprises the overall topology (i.e., structure) of the graph 106. Also captured within the graph 106 is the graph geometry, which is expressed in terms of distances, angles and other characteristics of the graph components (edges and vertices). The graph geometry can be expressed as a series of feature vectors (all features) or the graph's Alphabetic Kernel (selected features). The feature vector is a multi-dimensional expression of the multitude of measurements that are extracted from the graph 106 and the Alphabetic Kernel represents the subset of these features that distinguishes among isomorphic graphs representing different classes such as the letters of the alphabet. In one embodiment, the graph 106 in FIG. 1 depicts an entire word. In another embodiment, the graph in FIG. 1 depicts a word segment (a grouping of continuous characters within a word). In still another embodiment, the word graph 106 in FIG. 1 depicts just a single character. For purposes of simplifying the present discussion, the term "character string" will be used to represent words, parts of words, and individual characters that can be extracted from handwritten samples.

Figure 2:
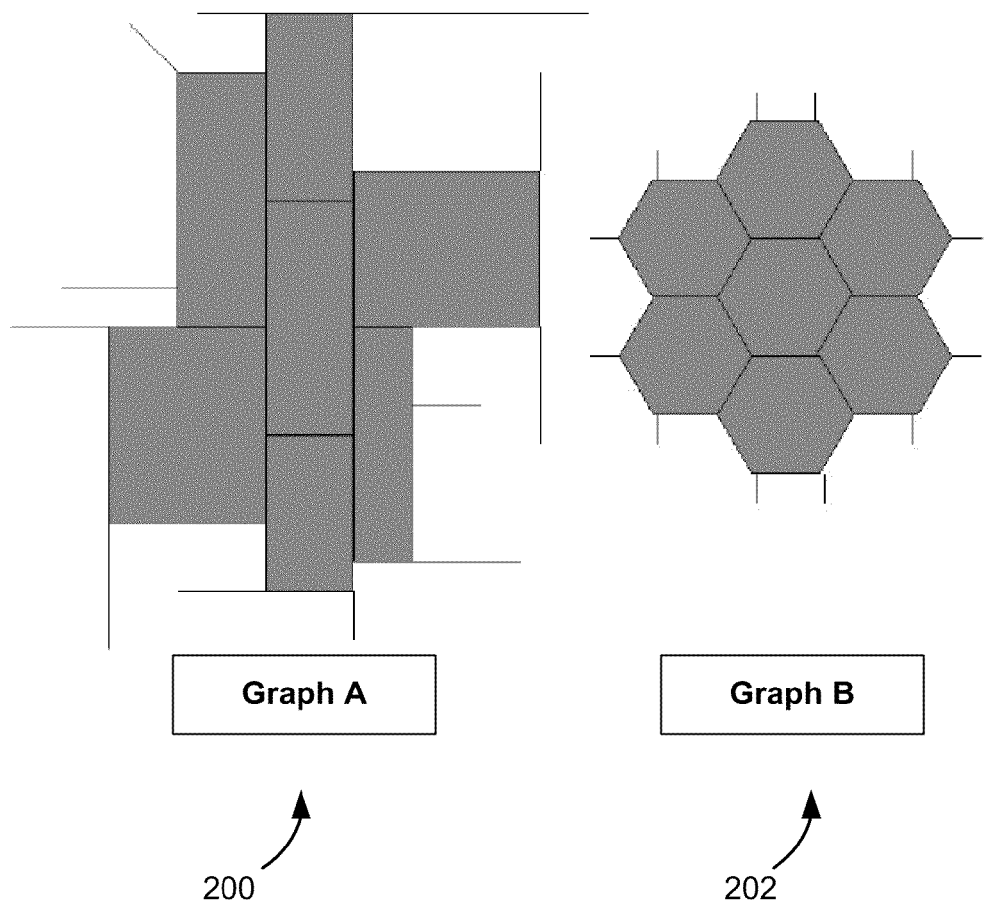
FIG. 2 is an illustration of two isomorphic graphs with different features, in accordance with one embodiment.

Two or more graphs are considered isomorphic when they have the same topologies. For example, as depicted in FIG. 2, Graph A 200 appears to have substantially different features than Graph B 202. However, Graph A 200 and Graph B 202 are considered isomorphic as they share an identical topology. That is, they (i.e., Graph A 200 and Graph B 202) have the same number of nodal points and strokes connected in exactly the same way. Graph A 200 and Graph B 202 appear to be different only because their respective geometries are different, that is, the topologies of Graph A 200 and Graph B 202 are identical whereas the angles and distances between their respective features (i.e., nodal points and linkages) are different. In one embodiment, the graph topologies are algorithmically converted to a representative numeric code (i.e., isomorphic database key). The unique code will always be associated with a particular unique topology and all topologies isomorphic to it. In another embodiment, the topologies, considered in concert with their attendant physical measurements, are converted into a representative word, character string or individual character. It should be understood, however, that the graph topologies can be converted into any type of data string as long as the string reproducibly conveys the topology and geometry of the character string in a format that can be readily computed. One method for constructing this code is presented in U.S. patent application Ser. No. 10/791, 375, entitled "SYSTEMS AND METHODS FOR SOURCE LANGUAGE WORD PATTERN MATCHING" herein incorporated by reference.

Figure 3A:
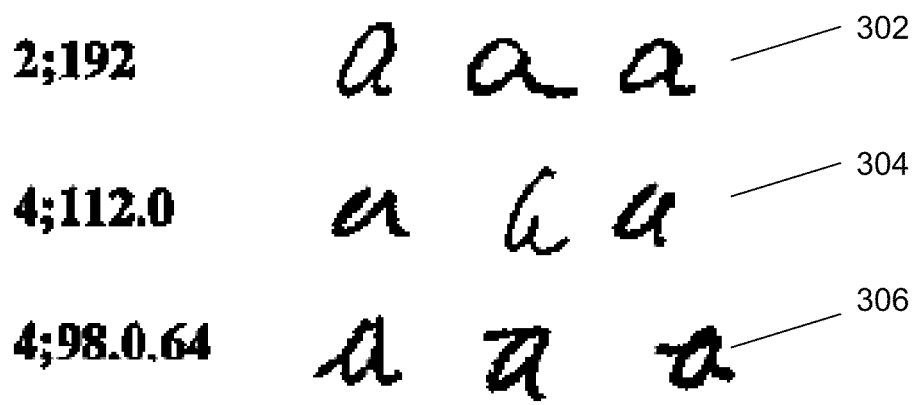
FIG. 3A is an illustration of sample character "a" for three different graph isomorphic classes, in accordance with one embodiment.
Figure 3B:
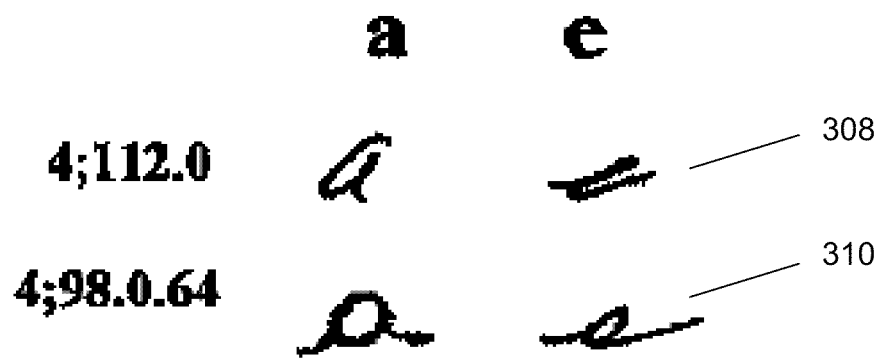
FIG. 3B is an illustration of sample characters "a" and "c" sharing the same isomorphic graph, in accordance with one embodiment.

Identical characters, word segments, and/or words can result in graphs that have different topologies due to variations in the handwriting representations of the character or word segment. This is shown in FIG. 3A, where three different graph isomorphic classes are depicted for handwritten representations of the character "a". That is, the classes labeled "2;192" (302), "4;112.0" (304), and "4;98.0.64" (306) all depict handwritten representations of the character "a", each having a different topology. These "class numbers" are the numeric representation of the graph topologies generated by one example embodiment. Despite having different topologies, all three classes are handwritten depictions of the same character "a". Moreover, different characters, word segments, and/or words can result in graphs that have identical topologies. Again, this is due to variations in the handwriting representations of the character string. This is shown in FIG. 3B, where representations of two separate topographic classes (i.e., "4;112.0" (308) and "4;98.0.64" (310)) show that characters "a" and "c" can share the same identical topographic class.

Figure 4A:
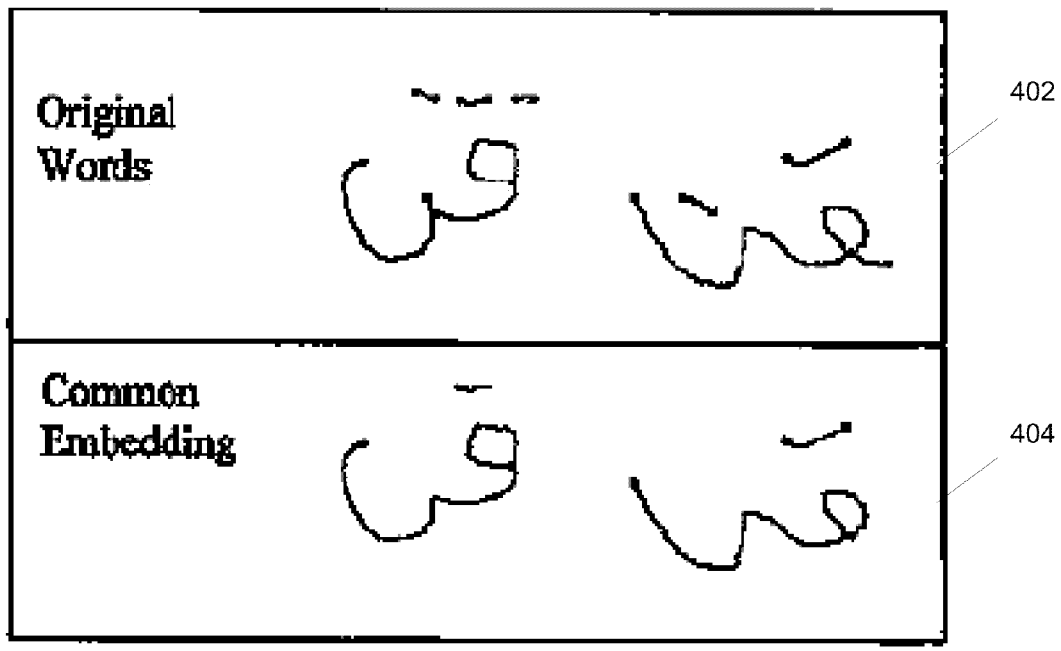
FIG. 4A is an illustration comparing an original handwritten form of an Arabic word segment to the common embedded forms of the word segment, in accordance with one embodiment.
Figure 4B:
FIG. 4B is an illustration of two representations of the character "E" where one representation is the common embedded form of the other, in accordance with one embodiment.

Handwritten representations of the same characters, word segments (i.e., character sequences) and words are usually quite similar graphically and distinguished only by a few differences such as extra or omitted strokes. Because of these differences, the graphs that they produce will be different within the strict definition of graph isomorphism. However, as depicted in FIG. 4A, there will often exist an embedded graph that transcends multiple handwriting samples and is isomorphic across samples. This embedded graph is referred to herein as the "common embedded form". In FIG. 4A, the common embedded forms 404 of two handwritten representations of a first Arabic word segment 402 are depicted. As can be seen in FIG. 4A, the two handwritten forms of the first Arabic word segment 402 have several differences principally related to additional strokes along the top and bottom of the word segment 402. However, they do share significant common embedding as shown by the common embedded graphs 404 in the lower portion of the figure. FIG. 4B shows two examples of the character "E" where the left form 406 is completely embedded in the right form 408. It should be understood that the concept of common embedded forms is not unique to Arabic, or English. This concept applies to all written languages including those with "Latin-based" characters, such as English, Semitic languages such as Arabic and particularly applies to "pictoform-based" languages such as Kanji and Chinese.

Figure 5A:
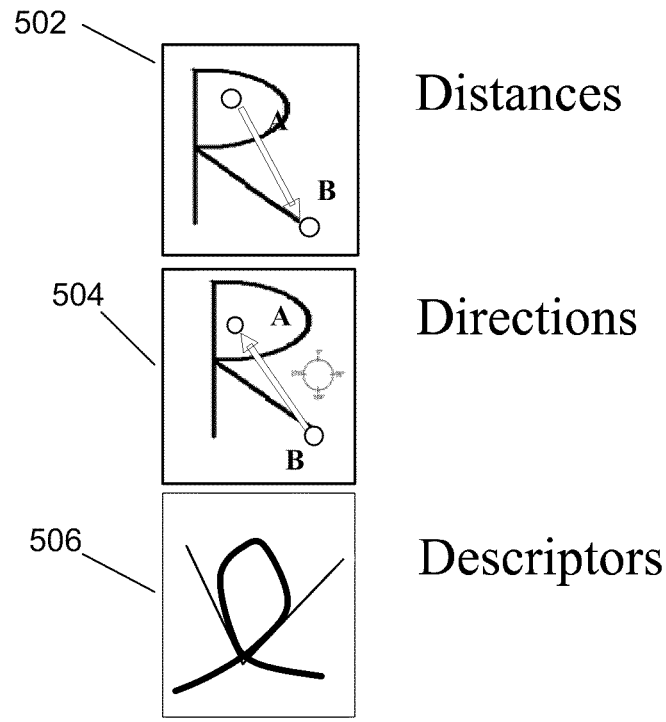
FIG. 5A is an illustration of the various types of measurements that can be obtained from a character or word segment graph, in accordance with one embodiment.
Figure 5B:
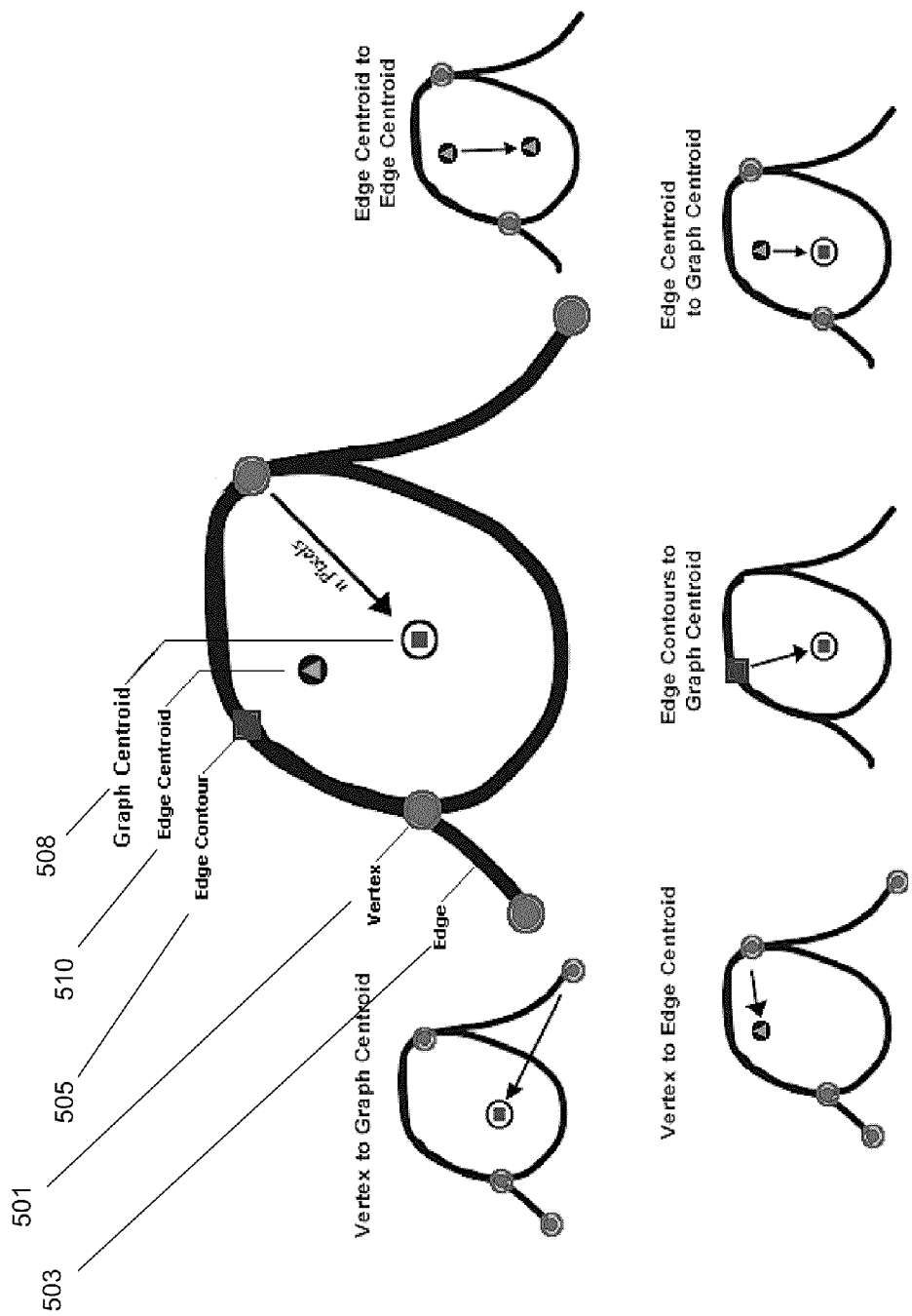
FIG. 5B is an illustration of how the distances among the various graph features can be measured, in accordance with one embodiment.

FIG. 5A is an illustration of the various types of measurements that can be obtained from a character, word segment, or word graph, in accordance with one embodiment. As depicted herein, the distances 502 among the various graph features can be measured. In one embodiment, the graph features measured are the nodal points 501 (i.e., vertices) of the graph. In another embodiment, the graph features measured are the linkages (i.e., edges) 503 of the graph. In still another embodiment, the graph features measured are a mixture of the nodal points 501 and linkages 503 of the graph. It should be understood that any type or form of graph features can be measured as long as the features can be reproducibly located on the graph. For example, as shown in FIG. 5B, the distances can be measured between other graph features such as the edge contours 505, graph centroid 508, and the edge centroid 510. In the systems and methods described herein, the action of determining graph isomorphism leading to the production of the isomorphic key yields a byproduct in the form of graph alignment. That is, once two graphs have been determined to be isomorphic, the same method yields a one-to-one mapping of the linkages (i.e., edges) and nodal points (i.e., vertices) between graphs. This mapping enables physical measurements to be directly compared.

Figure 5C:
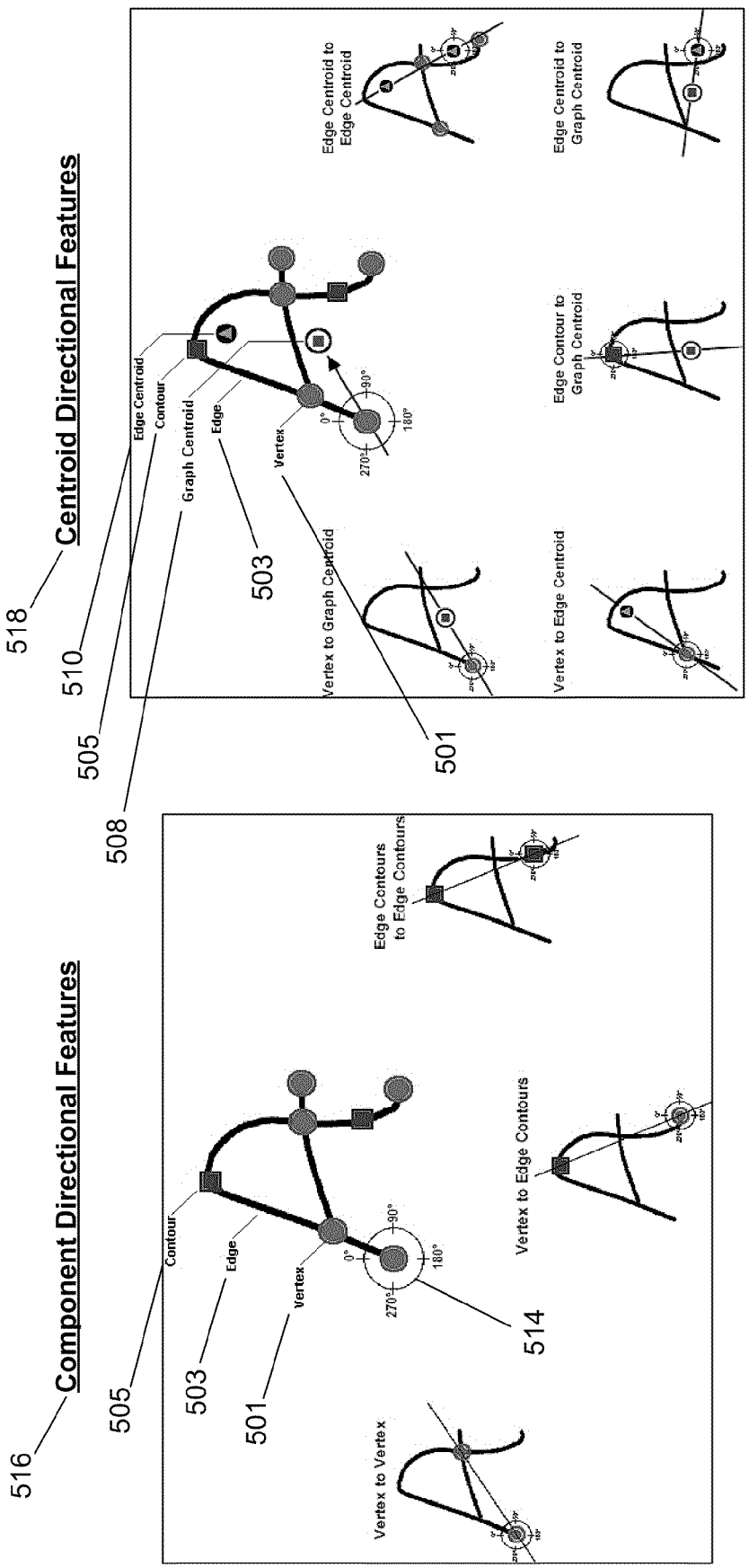
FIG. 5C is an illustration of how the angle can be measured in two separate classes of graph components, in accordance with one embodiment.

Furthermore, the directions 504 among the various graph features can be measured. The direction 504 being quantified as the angles between the various graph components. As shown in FIG. 5C, the angle 514 can be measured in two separate classes of graph components: the component directional features 516 and the centroid directional features 518.

Examples of component directional features 516 include the graph nodal points (i.e., vertices), linkages 503 (i.e., edges), and edge contours 505. In one embodiment, the angle 514 is measured from one nodal point 501 to another nodal point 501. In another embodiment, the angle measured from one edge contour 505 to another edge contour 505. In still another embodiment, the angle measured is from one edge contour 505 to a nodal point 501 or vice versa. It should be appreciated, that the angles 514 between any type of component directional features 516 can be measured as long as the features can be reproducibly located on the graph.

Examples of centroid directional features 518 include the graph centroid 508 and the edge centroid 510. In one embodiment, the angle 514 is measured between some pairing of a nodal point 501 with either a graph centroid 508 or an edge centroid 510. In another embodiment, the angle 514 is measured between one graph centroid 508 and another graph centroid 508. In still another embodiment, the angle 514 is measured between one edge centroid 510 and another edge centroid 510. It should be understood, that the angles 514 between any type of centroid directional features 518 can be measured as long as the features can be reproducibly located on the graph.

Figure 5D:
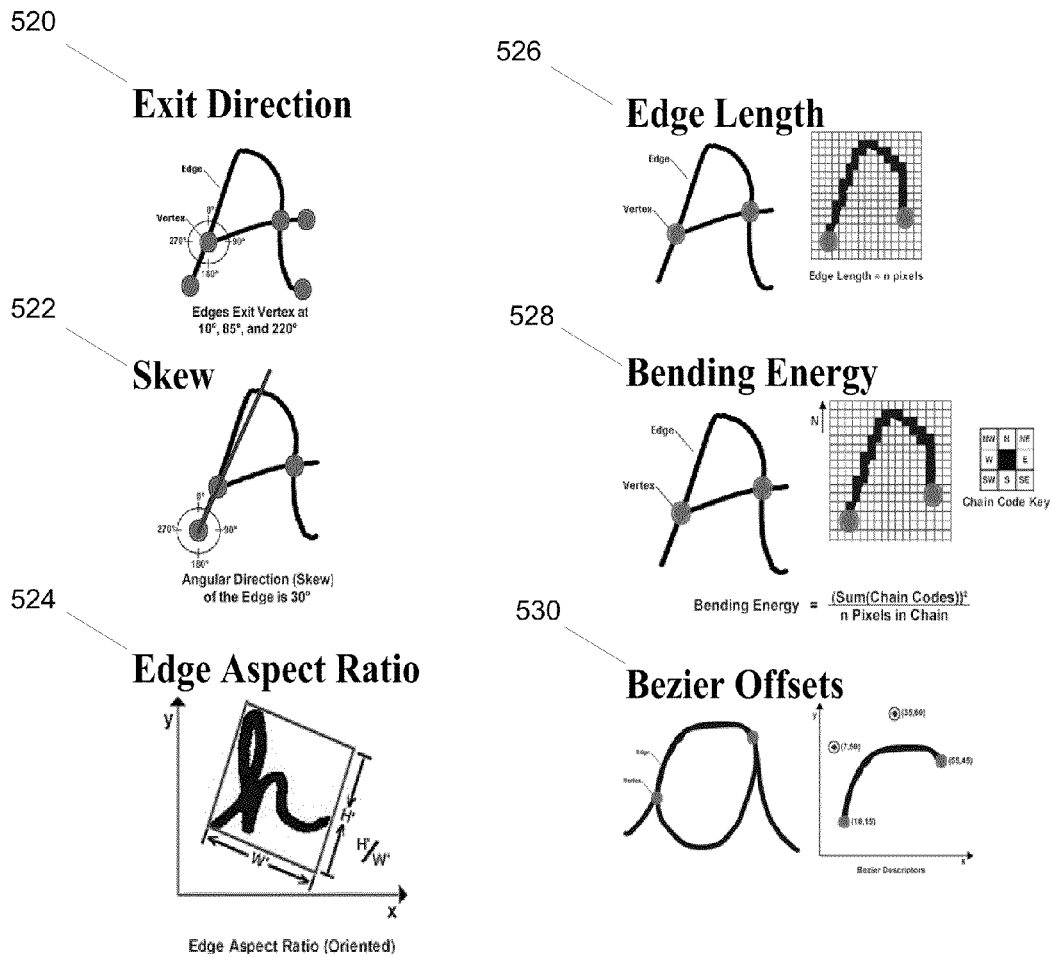
FIG. 5D is an illustration of the various other forms of descriptor features on the graph that can also be measured, in accordance with one embodiment.

Continuing with FIG. 5A, various other forms of descriptor features 506 on the graph can also be measured. As shown in FIG. 5D, these other forms of descriptor features 506 include the exit direction 520, the skew 522, the edge aspect ratio 524, the edge length 526, the bending energy 528, and the Bezier offsets 530. The exit direction 520 represents the direction an edge (i.e., linkage) exits a vertex (i.e., nodal point). The skew 522 is the angular direction of an edge. The edge aspect ratio 524 is the ratio of the height and width edge. The edge length 526 is the actual path length along an edge. The bending energy 528 is the amount of curvature in an edge. The Bezier offsets are the X and Y coordinates of the Bezier descriptors. Bezier descriptors are individual points that can be linked to the mathematical representation of a curve.

Together, the various types of measurements (e.g., distance 502, direction 504, and descriptor features 506) discussed above can comprise the feature vectors for a graph extracted from a handwritten character string. The combination of the topology and feature vectors can be used to identify any handwritten character string. It is important to note that the graph feature vectors of a character string graph can consist of any combination of the graph features measurements just described.

Figure 6:
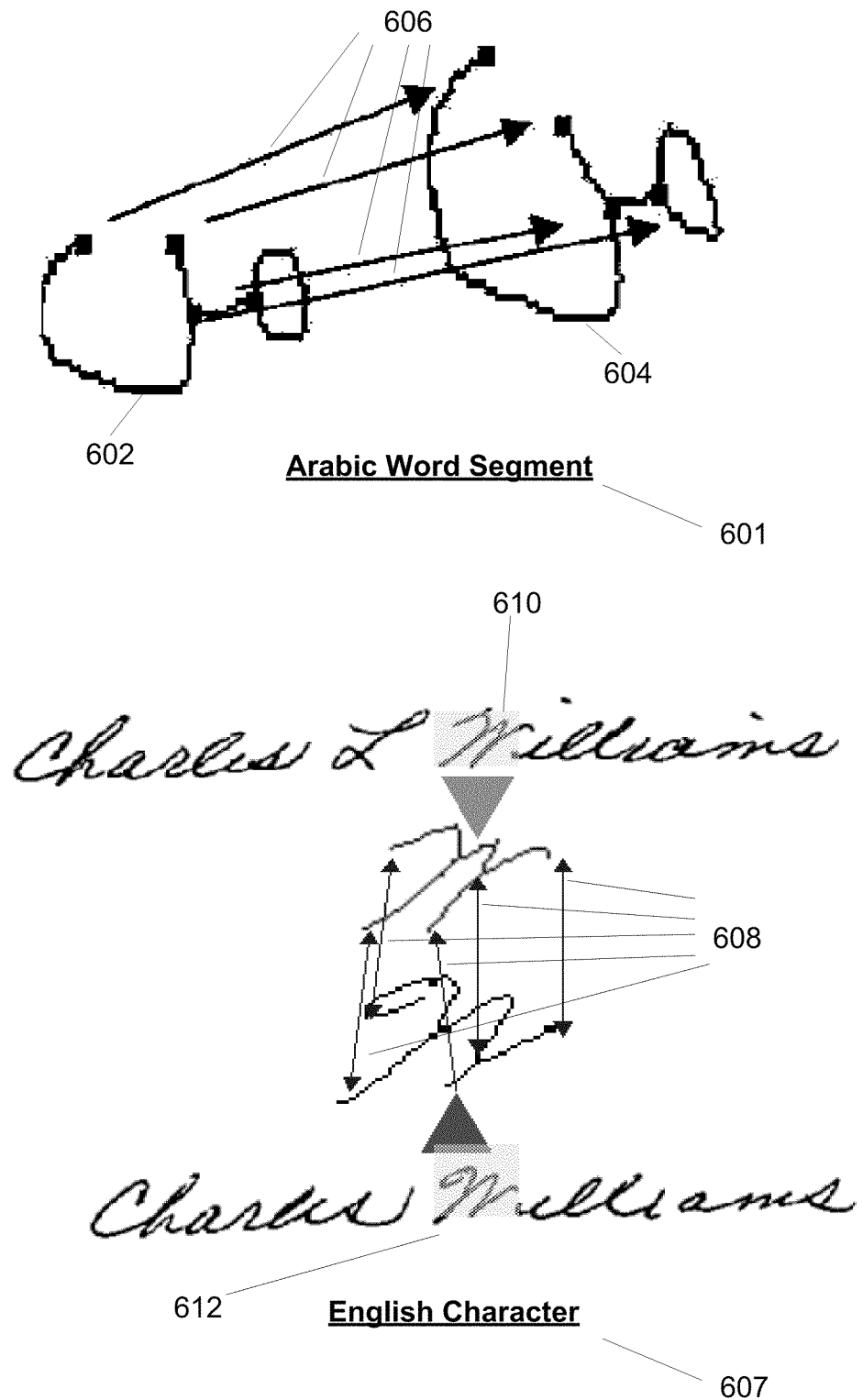
FIG. 6 is a depiction of how the isomorphic graphs of an Arabic word segment and an English character can be aligned for feature vector comparison purposes, in accordance with one embodiment.

FIG. 6 is a depiction of how the isomorphic graphs from different handwriting samples can be aligned for feature vector comparison purposes, in accordance with one embodiment. As shown herein, an alignment is performed for two different handwriting samples of an Arabic word segment 601. A first isomorphic graph 602 generated from a first handwriting sample of an Arabic word segment is matched and aligned against a second isomorphic graph 604 generated from a second handwriting sample of the same Arabic word segment. A match means that the topologies of the two graphs are identical, which is the very definition of graph isomorphism. An identical approach to alignment is also shown for two different handwriting samples of an English character 607. As depicted, a first isometric graph 610 generated from a first handwriting sample of an English character "W" is matched and aligned against a second isometric graph 612 generated from a second handwriting sample of the same English character.

In one embodiment, alignment means that all nodal points (i.e., vertices) and linkages have achieved "point-to-point" alignment in corresponding pairs, indicated by the arrows 606 and 608 in the figure. In another embodiment, alignment means that only the nodal points have achieved "point-to-point" alignment in corresponding pairs. In still another embodiment, alignment means that only the linkages have achieved "point-to-point" alignment. After the nodal points and/or linkages are aligned, the graph feature vectors of the first (i.e., 602 and 610) and second (i.e., 604 and 612) isomorphic graphs can be compared in detail to equate or distinguish one graph from the other.

As shown in FIG. 6, the first (i.e., 602 and 610) and second (i.e., 604 and 612) isomorphic graphs were extracted from different handwritings samples of the same word or character from different writers; however, they share common isomorphic graph forms (i.e., matching) and when aligned their feature vectors are compared against each other to see if the characters or word segments they represent are equivalent. In one embodiment, the comparison results in a numerical rating that is indicative of how well the two graphs match one another. For example, a numerical value can be provided after the comparison that is directly proportional to how well the various feature measurements of the two graphs fit each other. In another embodiment, that comparison results in a probability conclusion. For example, the comparison can result in a percentage value (that varies from 0 to 100) that is related to the probability that the two graphs match based on how many of the various feature vector measurements equate between the two graphs match. In still another embodiment, the comparison results in a definitive conclusion of whether a match exists. For example, the comparison can result in a "yes" or "no" type of output from the comparison.

Figure 7:
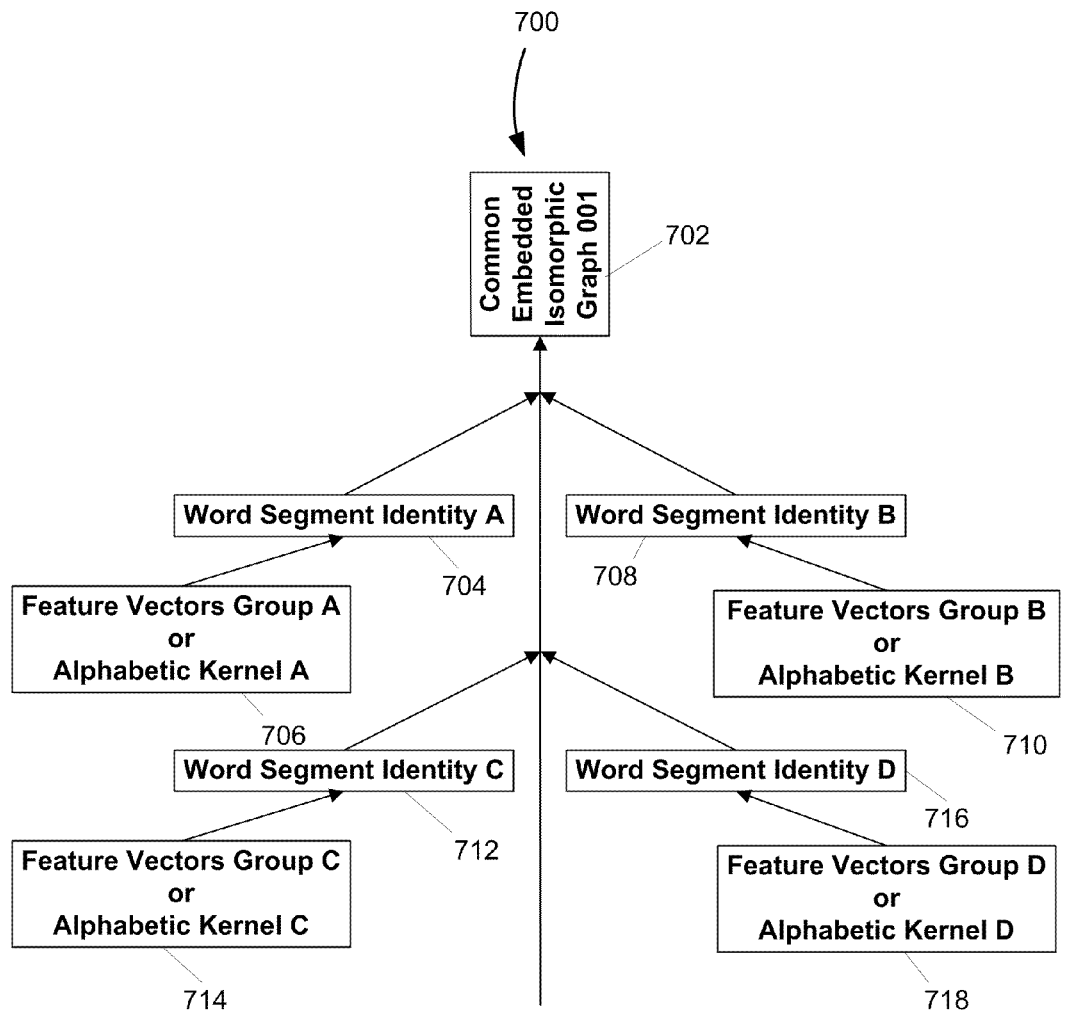
FIG. 7 is a tree diagram illustrating the process flow for how the feature vectors can be used to distinguish the graph from one particular character, word segment, or word from all the other characters, segments or words having the same isometric graph, in accordance with one embodiment.

FIG. 7 is a tree diagram illustrating the process flow for how the feature vectors can be used to distinguish the graph from one particular character, word segment, or word from all the other characters, segments or words having the same isometric graph, in accordance with one embodiment. In this figure, a tree diagram 700 is shown of a common embedded isomorphic graph "001" 702 form that is common for various different word segments (i.e., Word Segment Identity A 704, Word Segment Identity B 708, Word Segment Identity C 712, and Word Segment Identity D 716) each associated with a unique grouping of feature vectors or an Alphabetic Kernel (i.e., Feature Vectors Group A or Alphabetic Kernel A 706, Feature Vectors Group B or Alphabetic Kernel B 710, Feature Vectors Group C or Alphabetic Kernel C 714, and Feature Vectors Group D or Alphabetic Kernel D 718). As discussed above, feature vectors are the multitude of measurements that are extracted from a graph that distinguishes a particular character string from other characters, character strings that share the same topology (i.e., the same isometric graph form). It should be appreciated, that FIG. 7 depicts the process flow for distinguishing between different word segments by way of example only. In separate embodiments, the same process can be repeated to distinguish between different individual characters and whole words.

Alphabetic Kernels are multi-dimensional expressions of the actual physical features used to differentiate among character strings. Graphs present the opportunity to capture numerous physical measurements. A relatively simple graph, such as a "T" shape can be measured in hundreds of distinctive ways. Many of these measurements are highly correlated and when taken in full force represents the mathematical bane often referenced as "the curse of dimensionality". This "curse" results from having so much data that even items in the same class—such all written versions of the lowercase letter "a"—are differentiated from each other. This abundance of information is not always necessary for distinguishing among written forms. Rather, there are a few salient features that distinguish one written class from another—such as distinguishing a "b" from a "d" where the "curved" edge is located on the right side of the "b" and the left side of the "d". This salient set of features is referenced as the Alphabetic Kernel.

Alphabetic Kernels can be "teased" from the full set of feature vectors using a variety of techniques. In one embodiment the kernels are generated using a Regression Tree Classifier to identify the set of variables that distinguishes all class representations sharing the same isomorphic structure. The Regression Tree Classification builds a decision tree where each "split" is based on the values of physical measures. When the tree structure is created, certain key measurements (i.e., features vectors) are used as the basis for the branching decisions. The tree structure leads to a set of "Terminal Nodes" each representing a particular character or word segment identity. A graph can be classified using a tree by evaluating the physical measurements (i.e., features vectors) that are related to each branching decision. These measures are derived directly from the full graph feature vector. The tree is built during a modeling activity using the Regression Tree Classifier. When an actual classification of a graph is performed, decisions are made and a path followed until a "Terminal Node" is reached. Assigned to the "Terminal Node" is the classification value that the tree will assign to the graph being evaluated. The set of measures used to support the decisions leading to this classification are the Alphabetic Kernel. Alphabetic Kernels are unique to each graph isomorphism and to the various individual classes that share this isomorphism. They serve to distinguish the numerous classes of character strings (such as PAWs) that share the same isomorphic graph. It should be appreciated, however, that the kernels can be generated using any classifier modeling format (e.g. discriminant analysis, neural networks, etc.) as long as the resulting kernel can be adequately processed by a conventional computing device during the matching of an unknown character string against the various different character string identities saved in a data structure.

Continuing with FIG. 7, an example of a "Terminal Node" on a tree structure is provided where Word Segment Identity A 704 is associated with Features Vectors Group A or Alphabetic Kernel A 706, which distinguishes Word Segment Identity A 704 from all the other word segments (i.e., Word Segment Identity B 708, Word Segment Identity C 712, and Word Segment Identity D 716) that share the same common embedded isomorphic graph "001" 702 form. To identify an unknown character string, the feature vector or Alphabetic Kernel of the unknown character string is evaluated using a decision tree structure derived from the features vector or Alphabetic Kernel that describes a known character string sharing the same common embedded isomorphic graph. In one embodiment, the tree diagram 700 is saved as a dynamic link library (DLL) file that can be accessed during a comparison of the graphs. It should be understood, however, that the tree diagram 700 and related decision structures can be saved in any data file format (i.e., Extensible Markup Language, etc.) as long as the file format can capture the essential distinguishing characteristics (e.g., topologies, feature vectors, Alphabetic Kernels, etc.) of a graph so that it can be compared later for matching purposes. In other words, the essential logic to distinguish one written form from another can be stored both as data as well as executable computer code. The principal criterion for selecting the actual format is a function of actual throughput requirements for performing recognition.

Figure 8:
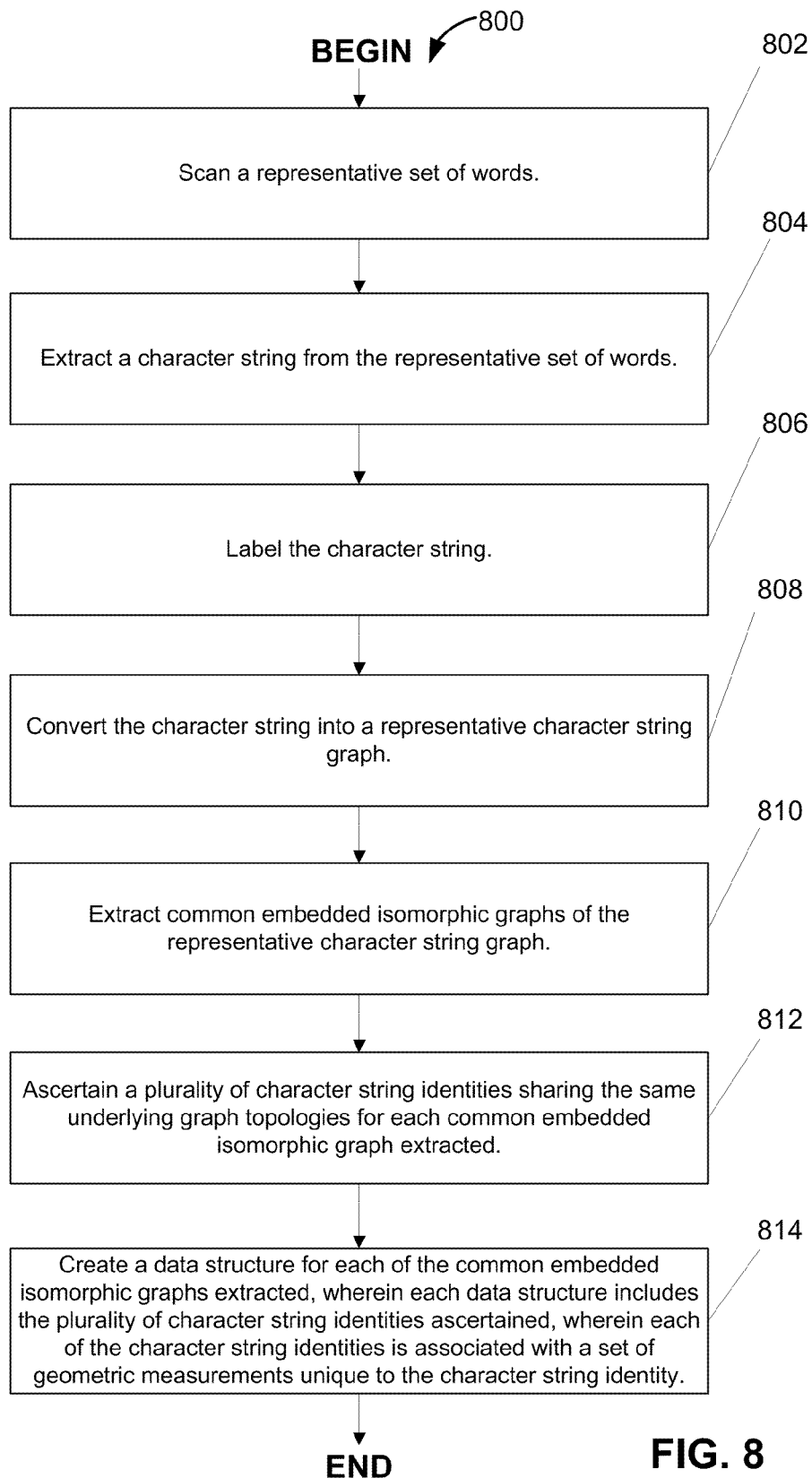
FIG. 8 is a flowchart of a method for creating a modeling structure for the various common embedded isomorphic graphs used in classifying handwritten words, word segments or characters, in accordance with one embodiment.

FIG. 8 is a flowchart of a method for creating a modeling structure for the various common embedded isomorphic graphs used in classifying handwritten words, word segments or characters, in accordance with one embodiment. Simply, as shown in FIG. 7, the modeling structure (i.e., tree diagram 700) maps out the feature vector characteristics of various word segment identities sharing the same embedded isomorphic graph form to support the classification of handwritten word segments. However, as discussed above, it should be understood that in other embodiments the same modeling structure depicted in FIG. 7 can be used to map out the feature vector characteristics of various individual characters or entire words sharing the same embedded isomorphic graph form. Method 800 begins with operation 802 where a representative set of handwritten words is scanned (i.e., extracted) into memory of a conventional computing device using a conventional imaging device. In one embodiment, the handwritten words are written in Arabic language script. In another embodiment, the handwritten words are written in English language script. It should be appreciated that the handwritten words can be written in any language as long as the words can be processed by a conventional computing device using algorithms based on Graph Theory into a graphic form that captures nodal point, linkage and vector feature information unique to the word.

The method 800 proceeds to operation 804 where a character string from the representative set of words is extracted. The character string can be comprised of any single character or continuous combination of characters within a word found in the representative set of words including the entire word itself. In one embodiment, the character grouping that comprises the character string is extracted based on the handwriting conventions that are characteristic for the language in which the word is written in. For example, handwritten Arabic words exhibit intrinsic segmentation (i.e., natural intra-word gaps) into character groups. This intrinsic segmentation occurs because Arabic handwriting conventions dictate that certain Arabic characters always connect while others never connect. In another embodiment, the character groupings can be extracted based on user defined rules that are particular to the particular language that the handwritten word is written in. It should be appreciated, however, that the character groupings can be extracted in accordance with any defined rule or characteristic of the handwritten word as long as the application of the rule or characteristic is reproducible from one iteration to the next.

The extraction of the character string in operation 804 can either be manual or automatic. In the case of manual extraction, a human operator uses a specially designed computer program to encapsulate the character strings graphically by drawing a polygon around these objects in a scanned image taken from an original document. In the case of automatic extraction, a computer program processes the image using prescribed logic (e.g., handwriting convention, user defined rules, etc.) to detect forms that should be extracted and labeled. This method presumes the writers who provide the handwriting samples write specified words, phrases and sentences in accordance with an established "script". Since a script is used to capture writing for automated extraction, this script is used to provide the identity of each extracted object. In the manual method, this identity is provided by human operators.

The method 800 moves on to operation 806 where the character string is labeled to clearly delineate the original identity of the character string. In one embodiment, the character string is labeled manually by an operator who types in the identity of the character string as each item is encapsulated during the manual extraction step described above. In another embodiment, the character string is labeled automatically using a script designed to provide the identity of each object (i.e., character string) extracted using the script.

The method 800 continues on to operation 808 where the character string is converted into a representative character string graph. Essentially, a character string graph coverts all the information extracted from the character string into a concise mathematical format that is highly computable. In one embodiment, a character string graph is comprised of the multiple nodal points and linkages within the character string. In another embodiment, the character string graph is comprised of either the nodal points or the linkages within the character string. It should be understood, however, that the character string graph can be comprised of any graphical information regarding the visible features of the character string as long as the information representing the unique aspects of the character string is reproducible.

Method 800 moves on to operation 810 where all the common embedded isomorphic forms of the representative character string graph are extracted. The common embedded isomorphic forms are those embedded graphs that capture the essential defining characteristics of the character string being processed. In one embodiment, during the identification of the common embedded isomorphic forms, a threshold setting can be used. For example, the threshold can be set to extract only those embedded graphs that occupy more than 75 percent of the graph's structure of the original character string from which they were extracted. It should be appreciated, however, that this threshold setting is presented by way of example only, in practice the threshold setting can be set to any value so long as the resulting common embedded graphs extracted retain the essential defining characteristics of the original character string graph.

In one embodiment, the common embedded isomorphic graphs of a character string are extracted using an "isomorphic database". That is, a database where all the common embedded isomorphic forms of a graph having a particular topology can be stored. For example, during a lookup on the isomorphic database, a character string is first converted into a graph to generate an isomorphic key based on the nodal points and linkages in the graph. The isomorphic key is then matched to the isomorphic database to extract all the common embedded isomorphic graphs for the particular character string that does not fall below a threshold value. In another embodiment, an algorithm is applied to the character string to arrive at all the common embedded isomorphic forms. This is accomplished by the algorithm "toggling on" and "toggling off" certain features (e.g., edges, nodal points, etc.) of the character string graph in accordance with a threshold setting. This technique will produce $2^n$ embedded graphs where "n" is the total number of graph features (nodes or strokes) in the graph. A threshold can be implemented using the physical dimensions of each edge and establishing a ratio of the aggregate lengths represented by the total number of edges toggled "off" or "zero" to the aggregate length of all edges in the entire graph. Thus, a threshold of 75 percent would include all embedded graphs that comprised "at least" 75 percent of the aggregate edge length entire graph.

The method continues on to operation 812 where a plurality of character string identities sharing the same underlying graph topologies of each of the common embedded isomorphic graphs extracted are ascertained. That is, various different character strings are identified for each of the common embedded isomorphic graphs extracted, each of the character strings having the same underlying graph topologies.

The method next proceeds to operation 814 where a data structure is created for each of the common embedded isomorphic graphs extracted. Each data structure including the plurality of different character strings that were ascertained for the character string. Each of the plurality of different character string identities are associated with a set of feature vectors (i.e., feature vectors groups or Alphabetic Kernels) unique to the character string identities. An example of the associations created by the data structure is illustrated in FIG. 7, which depicts a tree diagram 700 of various different character string identities (e.g., Word Segment Identity A 704, Word Segment Identity B 708, Word Segment Identity C 712, and Word Segment Identity D 716) each sharing the same underlying graph topology (i.e., common embedded isomorphic graph "001" 702) and associated with a grouping of feature vectors (i.e., Feature Vectors Group A or Alphabetic Kernel A 706, Feature Vectors Group B or Alphabetic Kernel B 710, Feature Vectors Group C or Alphabetic Kernel C 714, and Feature Vectors Group D or Alphabetic Kernel D 718) unique to each particular character string.

In one embodiment, the data structure encompassing the Alphabetic Kernels is derived using a regression tree classifier format. In another embodiment, the data structure is derived using a method based on discriminant analysis. In a third embodiment a neural network format is used. In all cases, the methods used to derive the data structure are configured to glean from the entire universe of features (the complete listing of feature vectors) a subset of salient features that effectively distinguish one class from another (i.e., the Alphabetic Kernel). This data structure derived during modeling provides the basis for classification of various classes sharing the same isomorphic structure by focusing on those features exhibiting the greatest power of discrimination among different classes. It should be appreciated, however, that the data structure can be derived and used for classification employing any predictive modeling format as long as the resulting structure can be adequately processed by a conventional computing device during the matching of an unknown character string against the various different character string identities saved in the structure.

Figure 9:
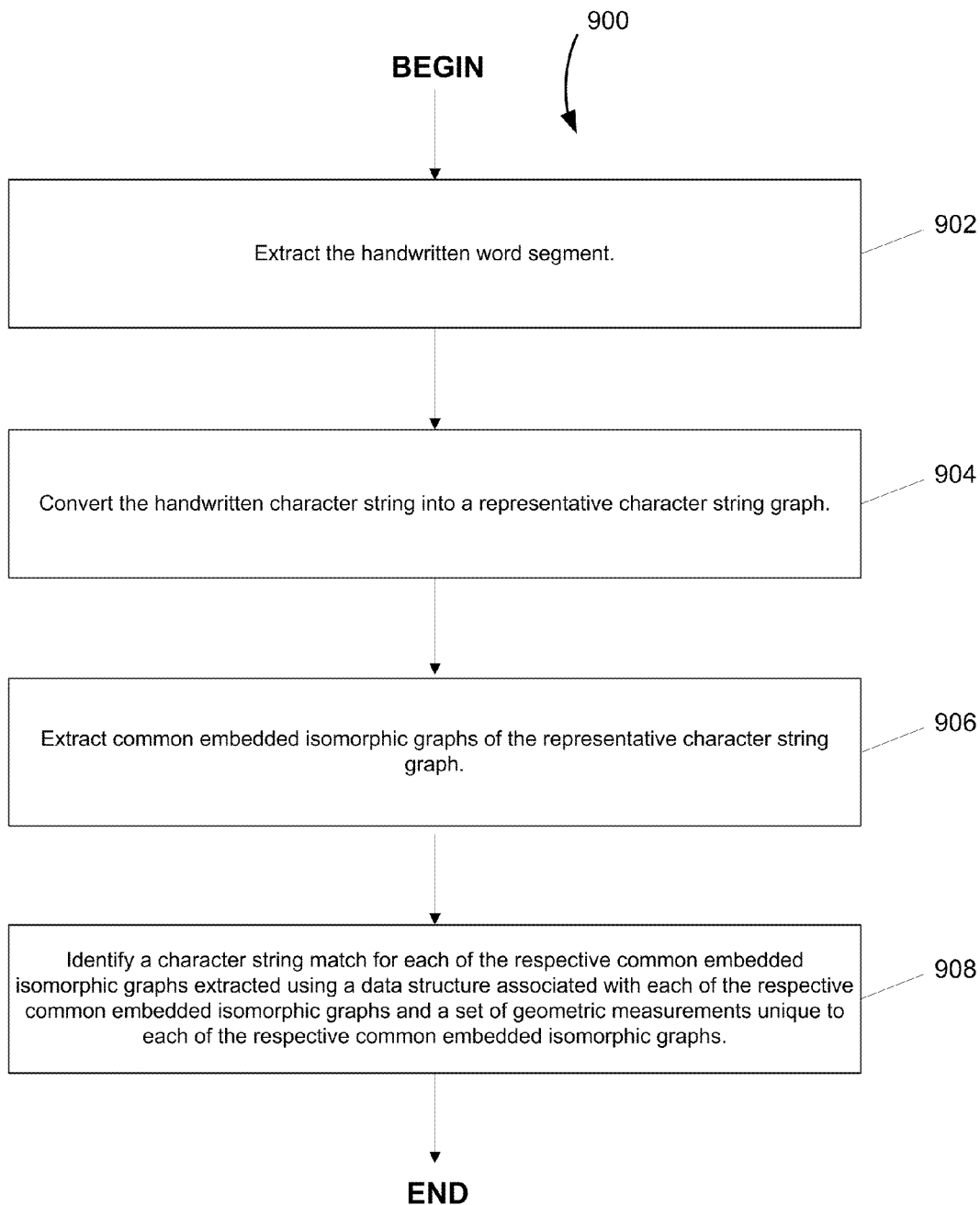
FIG. 9 is a flowchart depicting a method for identifying handwritten character strings, in accordance with one embodiment.

FIG. 9 is a flowchart depicting a method for identifying handwritten character strings, in accordance with one embodiment. As depicted in this flowchart, method 900 begins with operation 902 where a handwritten character string is extracted from a handwritten word. The character string can be comprised of any single character or continuous combination of characters within a word found in the representative set of words including the entire word itself. In one embodiment, the handwritten character string is written in Arabic language script. In another embodiment, the handwritten character string is written in English language script. It should be appreciated that the handwritten character string can be written in any language as long as the character string can be processed by a conventional computing device into a graphic form that captures nodal point, linkage and vector feature information unique to the character string.

The character string can be comprised of any single character or continuous combination of characters within the handwritten word including the entire word. In one embodiment, the character grouping that comprises the character string is extracted based on the handwriting conventions that are characteristic for the language in which the word is written in. For example, it is well known in the art that handwritten Arabic words exhibit intrinsic segmentation (i.e., natural intra-word gaps) into character groups. This intrinsic segmentation occurs because Arabic handwriting conventions dictate that certain Arabic characters always connect while others never connect. In another embodiment, the character groupings can be extracted or parsed based on user defined rules that are particular to the particular language that the handwritten word is written in. For example, prominent word features such as "ascenders" or "descenders" could be used as the basis for extracting character strings. Ascenders are characters that extend above the base body of a word. Descenders extend below the base body of a word. Other features could include "diacritical markings" such as dot over the letter "i". It should be appreciated, however, that the character groupings can be extracted in accordance with any defined rule or characteristic of the handwritten word as long as the application of the rule or characteristic is reproducible from one iteration to the next for particular written forms.

As was true in the case of modeling, the extraction of the character string in operation 902 can either be manual or automatic. However, in the majority of applications, the extraction will be automated. In the case of manual extraction, a human operator uses a specially designed computer program to encapsulate the character strings graphically by drawing a polygon around these objects in a scanned image from an original document. In the case of automatic extraction, a computer program processes the image using prescribed logic (e.g., handwriting convention, user defined rules, etc.) to detect forms that should be extracted and labeled. These rules derive from language characteristics such as the direction in which a language is written and read. For instance, English is written and read from left to right and Arabic is written and read from right to left. Other languages, such Chinese as can move from top to bottom of a page. These language conventions are but one set of requirements that drive extraction of written words. Other requirements include but are not limited to "white space" between written forms and "prominent features" within these forms.

Method 900 moves on to operation 904 where the handwritten character string is converted into a representative character string graph. As described above, a character string graph coverts all the information extracted from the character string into a concise mathematical format that is highly computable. In one embodiment, a character string graph is comprised of the multiple nodal points and linkages within the character string. In another embodiment, the character string graph is comprised of either the nodal points or the linkages within the character string. It should be understood, however, that the character string graph can be comprised of any graphical information regarding the visible features of the character string as long as the information can be used to uniquely represent the unique aspects of the character string are reproducible.

Method 900 proceeds to operation 906 where all the common embedded isomorphic forms of the representative character string graph are extracted. As discussed previously, the common embedded isomorphic forms are those embedded graphs that capture the essential defining characteristics of the character string being processed. In one embodiment, during the identification of the common embedded isomorphic forms, a threshold setting can be used. For example, the threshold can be set to extract only those embedded graphs that occupy more than 75 percent of the graphs structure of the original character string form which they were extracted. It should be appreciated, however, that this threshold setting is presented by way of example only in practice the threshold setting can be set to any value so long as the resulting common embedded graphs extracted retain the essential defining characteristics of the original character string graph.

In one embodiment, the common embedded isomorphic graphs of a character string are extracted using an isomorphic database. That is, a database where all the common embedded isomorphic forms of a graph having a particular topology can be stored. For example, during a lookup on the isomorphic database, a character string is first converted into a graph to generate an isomorphic key based on the nodal points and linkages in the graph. The isomorphic key is then matched to the isomorphic database to extract all the common embedded isomorphic graphs for the particular character string that doesn't fall below a threshold value. In another embodiment, an algorithm is applied to the character string to arrive at all the common embedded isomorphic forms. This is accomplished by the algorithm "toggling on" and "toggling off" certain features (e.g., edges, nodal points, etc.) of the character string graph in accordance with a threshold setting. This technique will produce $2^n$ embedded graphs where "n" is the total number of graph features (nodes or strokes) in the graph. A threshold can be implemented using the physical dimensions of each edge and establishing a ratio of the aggregate lengths represented by the total number of edges toggled "off" or "zero" to the aggregate length of all edges in the entire graph. Thus, a threshold of 75 percent would include all embedded graphs that comprised "at least" 75 percent of the entire graph. For example, if the threshold setting is at 75 percent, the algorithm will toggle the various features (e.g., nodal points, edges, etc.) on the character string graph and extract only those embedded graphs that occupy more than 75 percent of the aggregate edge length in the graph structure of the original character string form.

The method 900 continues on to operation 908 where a character string match is classified. Classification is the process of establishing an unknown graph's identity from each of its respective identification of common embedded isomorphic graphs. These embedded graphs are extracted using a data structure associated with each of the respective common embedded isomorphic graphs and feature vectors of the handwritten character string. As previously discussed in relation to FIG. 8 and depicted in FIG. 7, data structures (i.e., modeling structures) map out various character string identities sharing the same common embedded isomorphic graph forms to aid in the classification of handwritten character strings. The data structures associate each of the various character string identities with a multitude of measurements unique to each of the character string segment identities within any particular isomorphism. In the modeling stage, a salient set of features (i.e., Alphabetic Kernel or Feature Vectors Group) was identified for each character string identity. In classification, this set of features is used to support the decisions determining the identity of an unknown graph. In one embodiment, the multitude of measurements are presented in the form of a set of features vectors. In another embodiment, the multitude of measurements are presented in the form of an Alphabetic Kernel, which is just a multi-dimensional subset taken from the set of feature vectors.

For example, given an unknown handwriting character string A, 10 common embedded isomorphic graphs can be extracted from this form by toggling features and using a prescribed threshold value. The full graph and its 10 embeddings each present a multitude of measurements unique to each graph's topology (isomorphism). The unknown graph and its 10 embeddings can used to produce 11 isomorphic keys (the one unknown graph plus 10 embedded graphs yields 11 graphs). Each of these 11 keys will produce a feature vector consistent with each individual graph's isomorphism. These 11 isomorphisms and feature vectors can be then matched against the data structures for each of the 11 common embedded isomorphic graphs extracted during modeling. Using the features vectors or Alphabetic Kernels associated with the various character string identities within each data structure, a determination is made as to which of the character string identities best matches the 11 graphs extracted from handwritten character string A. It should be appreciated that the matching of the 11 graphs extracted from character string A to the data structures for 11 graphs matching character string A's full graph and each of its 10 common embedded isomorphic graphs can produce different results: (1) the same character string identity being identified for all 11 graphs classified, (2) different character strings identified for all 11 graphs or (3) some result in between. Again, the actual classification can be performed using decision trees derived through regression trees, discriminant analysis, neural networks or other methods that can be applied to classification problems.

The classification results from an unknown graph and its embeddings can be "voted" in a variety of ways to determine an overall classification value. In one embodiment, the results can be tabulated and the class matched to the most embeddings would be considered the best match. In another embodiment, a matrix method of scoring could be employed and the results could either be tabulated or distilled into a 2 by 2 contingency table to which an "odds ratio" methodology could be applied.

Figure 10:
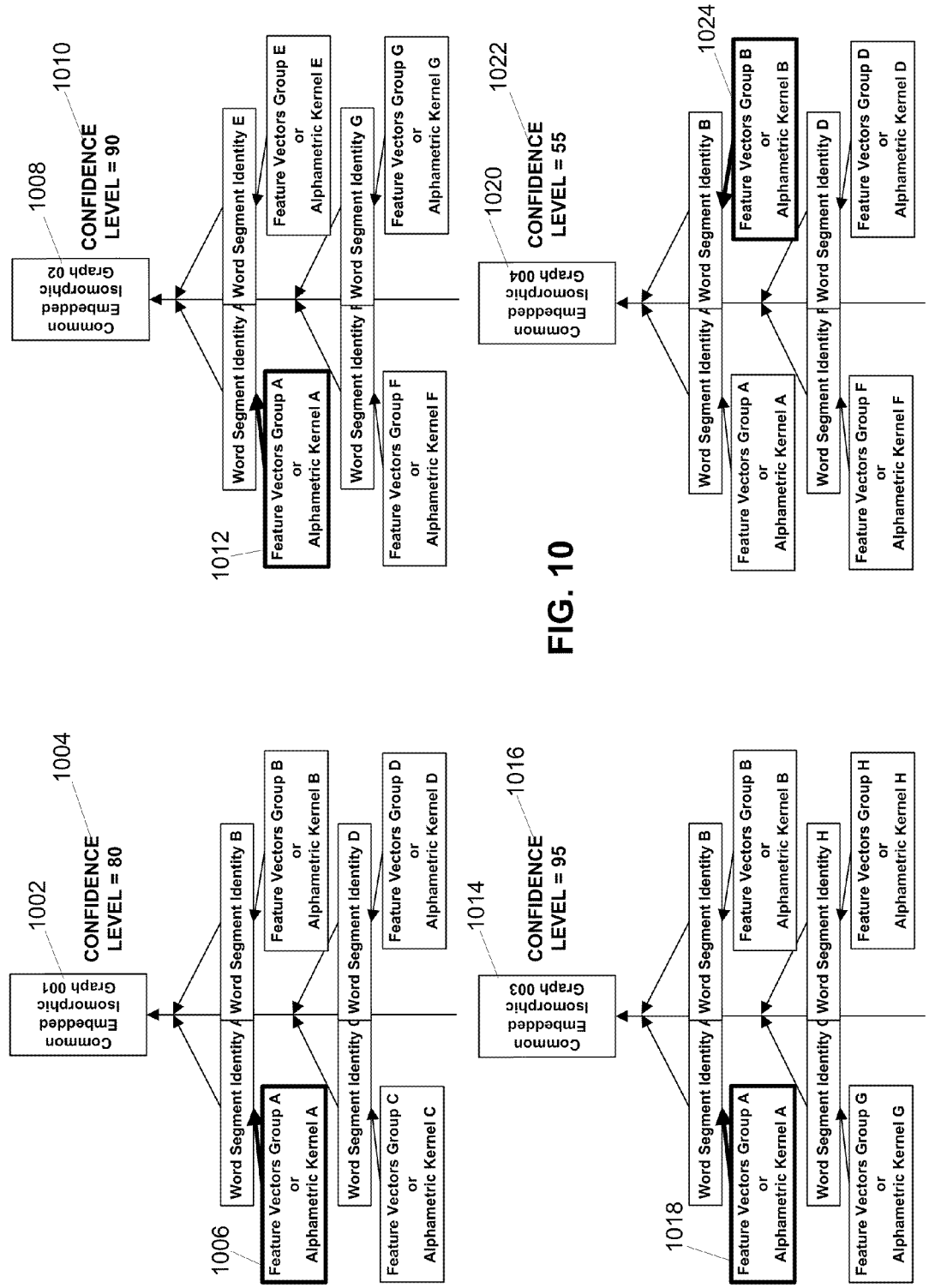
FIG. 10 is a depiction of the results of a classification of an unknown handwritten character string utilizing the data structures of the common embedded isomorphic graphs extracted for the handwritten character string, in accordance with one embodiment.

FIG. 10 is a depiction of the results of a classification of an unknown handwritten character string utilizing the data structures of the common embedded isomorphic graphs extracted for a handwritten character string, in accordance with one embodiment. As depicted herein, the data structures for the four different common embedded isomorphic graphs (e.g., Common Embedded Isomorphic Segment "001" 1002, Common Embedded Isomorphic Segment "002" 1008, Common Embedded Isomorphic Segment "003" 1014, and Common Embedded Isomorphic Segment "004" 1020) extracted from an unknown word segment (i.e., character string) is presented. It should be understood that the number of common embedded isomorphic graphs identified for a character string varies generally in accordance with the overall complexity of the character string structure and that four isomorphic graphs are presented herein by example only. Also, the full graph is also considered an embedded form where the embedding threshold is 100 percent.

During a character string classification operation, a multitude of measurements extracted (i.e., feature vectors, Alphabetic Kernel) from the unknown character string's embeddings are matched against each of the data structures for the extracted common embedded isomorphic graphs using a decision tree or comparable classification method. It should be noted that character string identities can be common across multiple data structures. That is, during matching of the measurements from the unknown character string against the data structures of the common embedded isomorphic graphs extracted, the same character string identity can result. For example, as shown herein, the data structures for the common embedded isomorphic graphs "001" 1002, "002" 1008, and "003" 1018 each matched the unknown word segment to word segment identity A (1006, 1012, and 1018). In addition to identifying a word segment identity, the matching operation results in a quantitative expression of the confidence level (see features 1004, 1010, 1016, and 1022) that the matched word segment identity is correct. In one embodiment, the quantitative expression is an expression of probability that the character string identity matched is correct. In another embodiment, the quantitative expression is a simple character string (numerical or otherwise) that is indicative of the level of confidence that the character string matched is correct.

Figure 11:
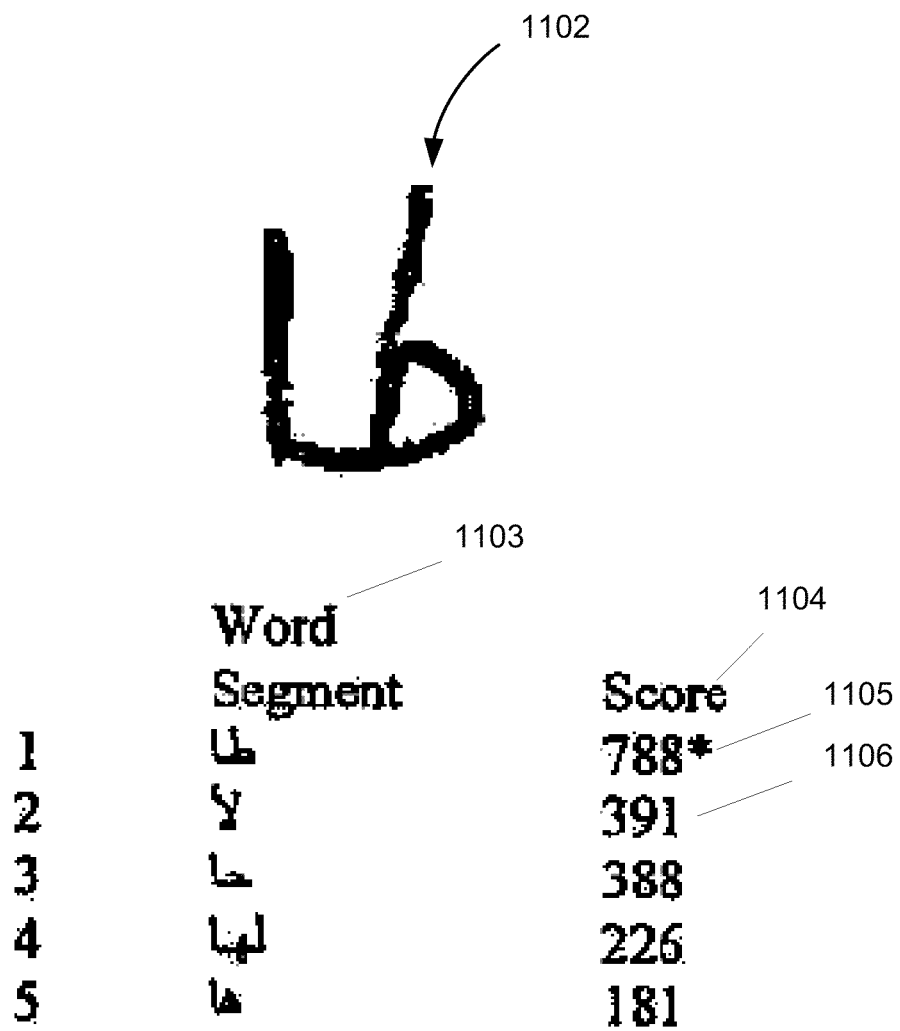
FIG. 11 is an illustration of how the results from a classification of an unidentified handwritten character string using a data structure can be presented, in accordance with one embodiment.

FIG. 11 is an illustration of how the results from a classification of an unidentified handwritten character string using a data structure can be presented, in accordance with one embodiment. As shown herein, the results table for an unknown character string 1102 contains two separate columns (i.e., "Word Segment" column 1103 and "Score" column 1104) summarizing the results from matching the unknown character string 1102 to the various common embedded isomorphic graphs extracted from the unknown handwritten character string 1102. The table presents the character string identities with the highest classification scores in descending order (character string identity with the highest classification score presented first). In one embodiment, the values in the "Scores" column 1104 are tabulated as the sum of the confidence level scores for each character string identity identified during the classification of the unknown character string 1102 against all the individual common embedded isomorphic graphs extracted for the character string 1102. For example, as shown in FIG. 10, character string identity A (1006, 1012, 1018) results from the classification of the unknown character string against the common embedded isomorphic graphs "001" 1002, "002" 1008, and "003" 1014. The confidence levels (1004, 1010, 1016) for all three embedded isomorphic graphs would therefore be summed to come up with the total classification score for character string identity A (1006, 1012, 1018). The confidence level is established as the culmination of individual scores for embedded graphs.

Continuing with FIG. 11, an asterisk 1105 is affixed next to the score associated with the character string identity that is the correct identification of the character string 11 02. However, in practice, the correct character string identity would be unknown. Ideally, the character string identity with the highest classification score would always be the correct identification of the character string, however, that is not always the case.

The same Graph-Theory based theoretic methods employed in handwriting recognition (as described above) are also extremely effective in detecting and extracting objects of interest that are embedded within large, complex images. Thus, the systems and methods described herein can be applied to recognizing and identifying images of all types, including but not limited to the following:

Identification of objects in microscopic images, including pollen spore species, mineral types, insects, etc.

Identification of objects in photographic images taken with cameras, including persons, both the automated identification of persons located within a photo and the biometric recognition of individuals' faces and/or other physical characteristics; automobiles; animals; signs; and anything else contained in the image.

Comparison of objects found in multiple images entailing both clustering of similar images and matching images against a single image or group of images designated as a "template".

Identification of objects in satellite images, such as buildings, vehicles, natural features.

Figure 12:
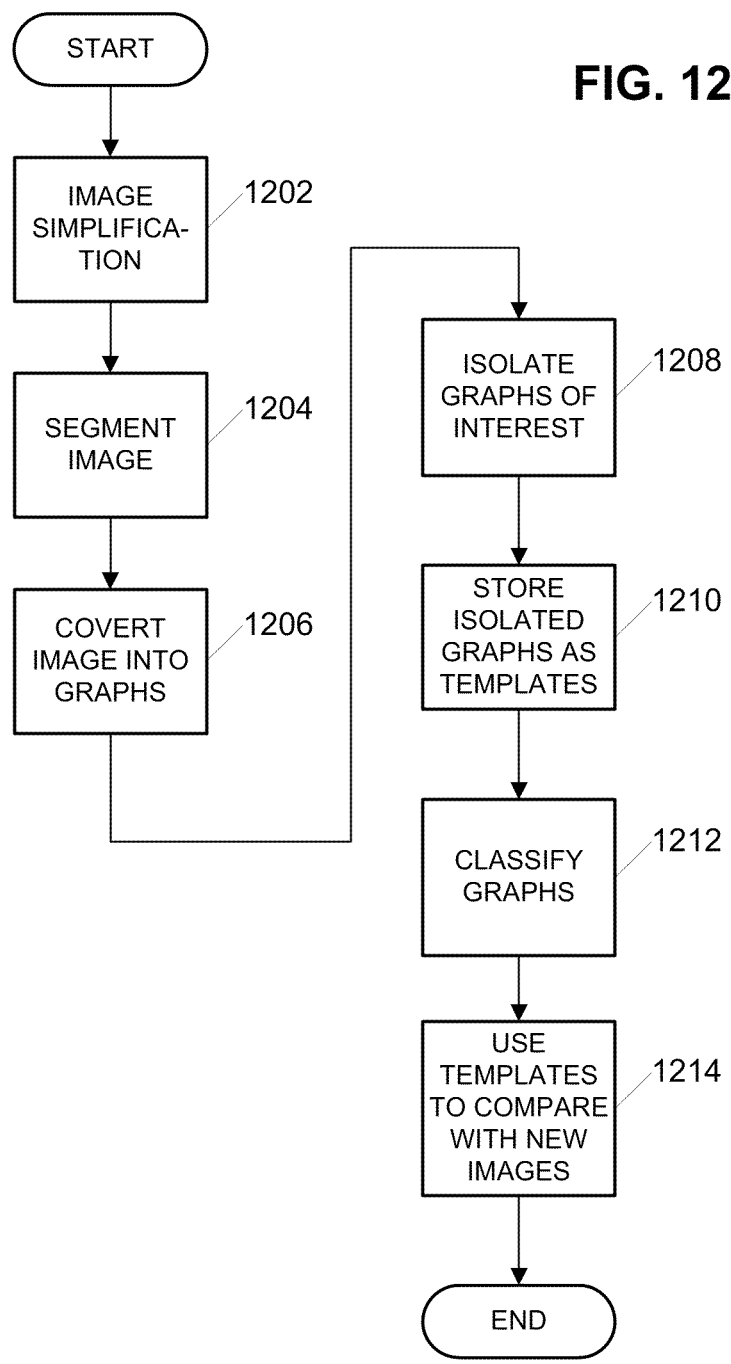
FIG. 12 is a flow chart illustrating an example process for identifying image features in accordance with one embodiment.

FIG. 12 is a flow chart illustrating an example process for applying the graph based techniques described above to detect features within an image in accordance with one embodiment. First, as illustrated in steps 1202 and 1204, some preprocessing of an image may be required in order to prepare the image for conversion into a graph or set of graph data. Thus, in step 1202 image simplification may be required to reduce the amount of data being converted. In step 204, the foreground and background of the image can then be segmented. These steps are described in more detail below.

Once the preprocessing is complete, then the process of generating the graph data can commence. In step 1206, for example, the preprocessed data can be converted into graphs or a set of sub-graphs. This data can then be used, e.g., to isolate graphs or features of interest within the image in step 1208. The graph data for the features of interest can then be stored as a template and classified in steps 1210 and 1212. These conversion steps are also described in more detail below.

In step 1214, the templates and classifications can then be used to compare against new images in order to determine if those images contain a feature of interest. This is also described in more detail below.

Because the objects in photographic images cannot be represented satisfactorily with line-graphs, the identification of non-textual images often requires some pre-processing (steps 1202 and 1204). During pre-processing, the system attempts to extract all detectable objects contained in the image. These objects can be transplanted from their native pixel space into a feature space and represented by graphs (step 1206).

Typical photographs and satellite images contain countless objects, among which are buried a few that are of interest. The superfluous information can be addressed by eliminating it directly by reducing image complexity through various image and signal processing techniques such as Wiener filtering, automatic brightness adjustment, contrast stretching, etc. These image simplification techniques (step 1202) can also sharpen object boundaries and obliterate minute variations in color, bright, and texture. The second stage (step 1204) can segment the foreground objects from the background image using a number of methods including, e.g., adaptive thresholding, morphological reconstruction, ridge detection, just to name a few. The product of these two stages is the segmentation of an image into regions with each region constituting a vertex of the graph that represents the image content. FIGS. 13A and 13B illustrate an image simplified by some of these methods effectively dividing the image of FIG. 13A into regions of interest as illustrated in FIG. 13B.

Figure 14A:
FIGS. 14A and 14B illustrate the result of feature extraction steps that can be included in the method of FIG. 12 on the image of FIG. 13.
Figure 14B:
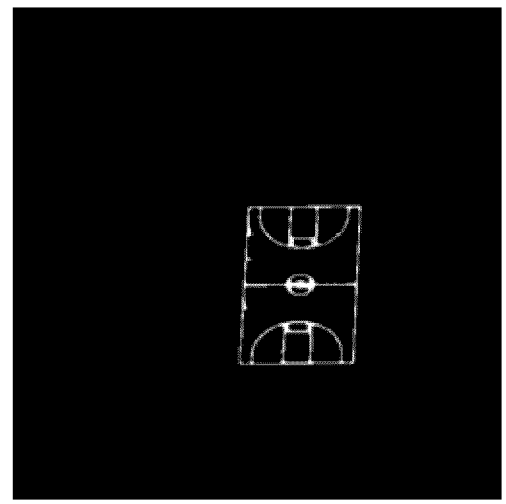

The FIGS. 14A and 14B illustrate an example of another simplification technique (step 1202) that can be used in conjunction with the systems and methods described herein. In this example, sharp, straight edges are accentuated while suppressing amorphous objects. Object- and sub-object-level graphs that are constructed (step 1206) from these edges can then be embedded within the higher-level graphs. For example, the basketball court object graph illustrated in FIG. 14B contains sub-graphs that represent the court markings.

The court object graph is, in turn, embedded within the blue region 1302 of the region graph in FIG. 13B that represents the entire image.

While elimination or reduction of unimportant information is a critical step toward preparing images for recognition, the graph-based recognition techniques described herein can be very "forgiving" regarding extra information. These Graph-based methods can be used to isolate graphs-of-interest (step 1208) embedded in more complex graphs. For example, the image in FIG. 13B is a graph and it can be used as a template (step 1210) for detecting similar forms, in whole or in part, regardless of orientation. In other words, the techniques described above can be used to determine whether a similar graph exists within another image (step 1214).

Thus, the objects or regions in an image that has gone through the simplification steps described above, as well as the visual content they each contain, can be converted into graphs (step 1204). Multiple techniques can be used to create the graphs, i.e., convert the simplified images into graphs. A few of these conversion methods are discussed as follows: In one approach, each object is converted into a vertex, and the border between the two objects is represented with an edge. Another approach involves identifying "edges" in the form of lines between objects and building graphs directly from these lines. Still, a third approach involves specifying criteria for what constitutes an edge such as objects that have definable shapes such as lines, circles, rectangles, or other geometric forms. It should be noted that these graph generation approaches are not mutually exclusive and can be used individually or in concert.

The graph-based data structure transforms the objects' physical and visual characteristics into topological relationships and concomitant feature data. Using the graph theoretic principles described herein, the data can be arranged into a structure composed of vertices and edges that connect those vertices. The vertices represent the individual data elements, and the edges represent the relationships that exist among the data elements.

The Graph-based Recognition methods described herein derive power from the way they can compare graphs. As noted above, a code can be assigned to each unique graph topology. In many cases, this encoding can be computed as a function of the adjacency matrix of an undirected graph. If two graphs are structured in the same way—that is, they are isomorphic—then the same code will always assign to them, which greatly simplifies the frequently used graph comparison operations. An added advantage of the Graph-based Recognition methods described herein is the ability to align graph structures efficiently. When two graphs are isomorphic, their data contents can be directly compared element-to-element, in accordance with their alignment.

With respect to images, it should be noted that images contain objects. These objects have intrinsic and extrinsic characteristics. Intrinsic characteristics include many distinctive visual features such as shape, color, texture, ridges, valleys, edges, interest points, etc. They also include less visual, but no less distinguishing, physical features such as location, orientation, area, circumference, accecentricity, fractal dimension of the border, etc.

Extrinsic characteristics are the spatial relationships that exist among the objects. Intersection, containment, adjacency, occlusion, distance, and perspective are some of the common types of spatial relationship.

Graph data structures described herein can store both intrinsic and extrinsic characteristics of objects. Bundling these two distinct kinds of object attributes into a single structure affords a wide variety of real-world problems to be tackled in an elegant and efficient way using a unified solution framework.

The appropriate set of features to use depends on the type of application. For biometric face identification, inter occular distance, nose ridge length, jaw line, etc., are important. For biometric fingerprint identification, arches, loops, and whorls are of interest. For recognizing man-made structures in satellite imagery, geometrical ridges are significant. The systems and methods described herein are capable of encoding and processing all of these feature types for a variety of application domains.

In the handwriting application, written forms can be converted into graph-based data structures and recorded as reference material. When a new written form is encountered, it too is converted into a Graph-based Recognition structure and very efficiently compared to the known forms. This efficiency is possible because the data records can be referenced using the graph isomorphic keys. As further evidence of the power of Graph-based Recognition as described herein, key codes can be generated for graphs embedded within larger graphs, so it is possible to recognize characters and words even if they overlap with one another or are encumbered by a very noisy background. Graph-comparison principles similar to those used for handwriting recognition can also be applied to the identification of objects in non-text images.

Figure 15:
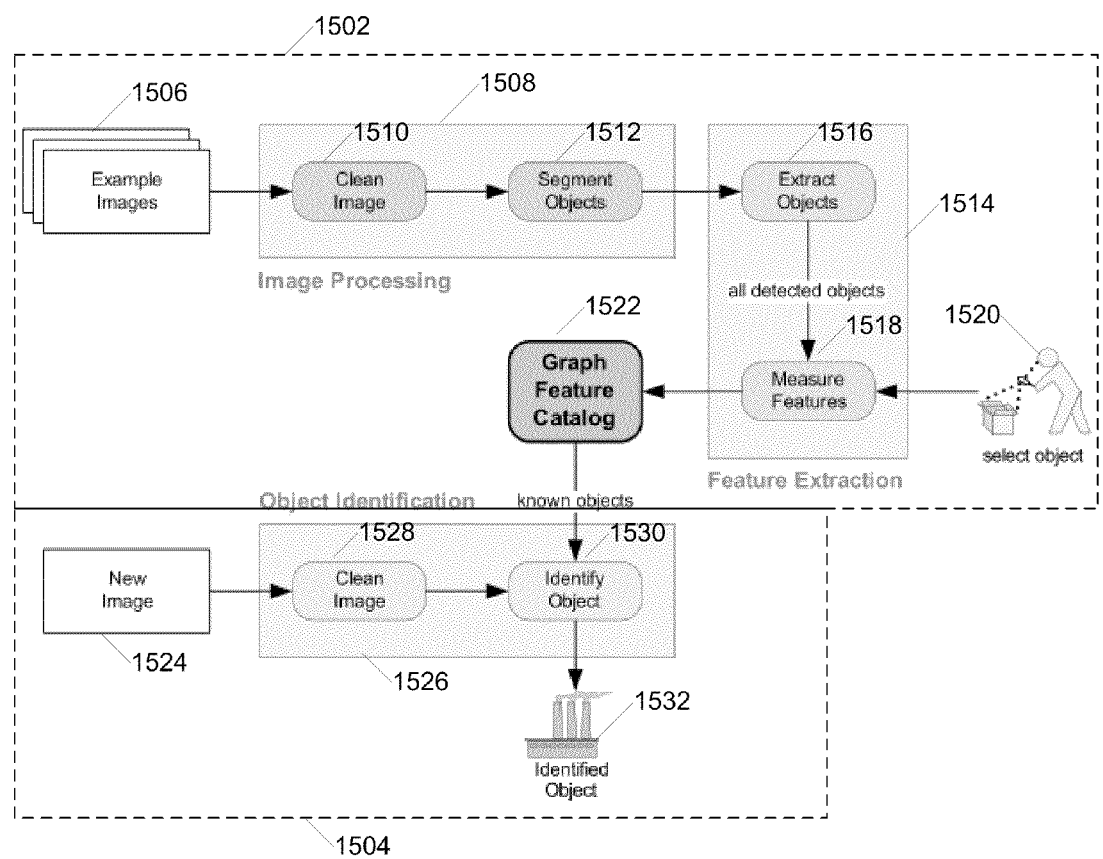
FIG. 15 is a diagram illustrating an example process of detecting features in a new mage in accordance with one embodiment.

The comparison process (step 1214 )for images can involve a two-phase approach consisting of (1) training and (2) identification phases. The interaction between these two processes is illustrated in FIG. 15. Note that in a variant form of the process, the image processing can also be performed on "testing" data, to improve the graph extraction process from the images of unknown objects.

As can be seen, the process of FIG. 15 is divided into a training track 1502 and a comparing track 1504. Track 1502 begins when one or more images are provided in step 1506. The images then go through a preprocessing stage 1508 and a feature extraction stage 1514. The preprocessing stage 1508 can comprise cleaning of the image in step 1510, e.g., image simplification, and segmentation of the image in step 1512. The feature extraction stage 1514 can comprise extracting objects from the image in step 1516 and measuring features included in those objects in step 1518. As described below, a feature classification can also take place in step 1520.

The extracted features can then be stored in a library or graph feature catalogue in step 1522.

Track 1504 then begins when a new, unclassified image is provided in step 1524. The new image can then go through an object identification stage 1526 that can comprise pre-processing, such as an image cleaning step 1526 and object identification step in which objects included in the image can be compared to objects stored in the catalogue in step 1530 in order to allow identification of various objects in step 1532.

It should be noted that when graphs are used for recognition, it is not necessary to have a single training graph that matches a graph being tested to achieve recognition. While this type of one-to-one relationship will work, graph-based recognition can also be accomplished by combining the results of the comparison of numerous embedded "sub-graphs" common to two objects being compared.

For simple objects, graphs derived during training can actually encompass the entire object—or most of the object. This is often the case for handwriting recognition. However, as the graphs grow more complex—especially those derived from imagery—recognition is most likely to be based on the compilation of multiple recognitions performed on embedded sub-graphs. The motivation for relying on sub-graphs is the high likelihood that similar objects viewed at different times, such as for training and testing, will not appear exactly alike. However, they will have common features that can be described through graphs. By using these smaller, embedded graphs, recognition can be based on a "preponderance of evidence" approach. That is, if two objects share enough embedded graphs with the same features, they are likely to be two occurrences of the same object.

Figure 16A:
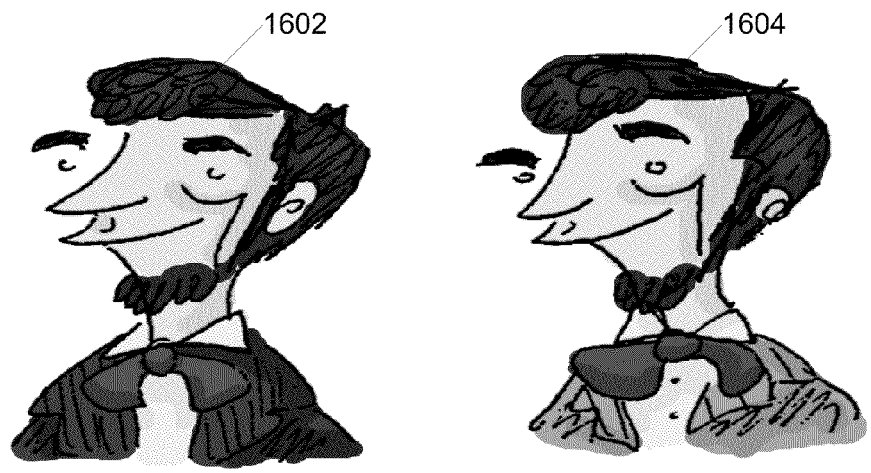
FIGS. 16A and 16B are diagrams illustrating the result of feature extraction on a set of images.
Figure 16B:
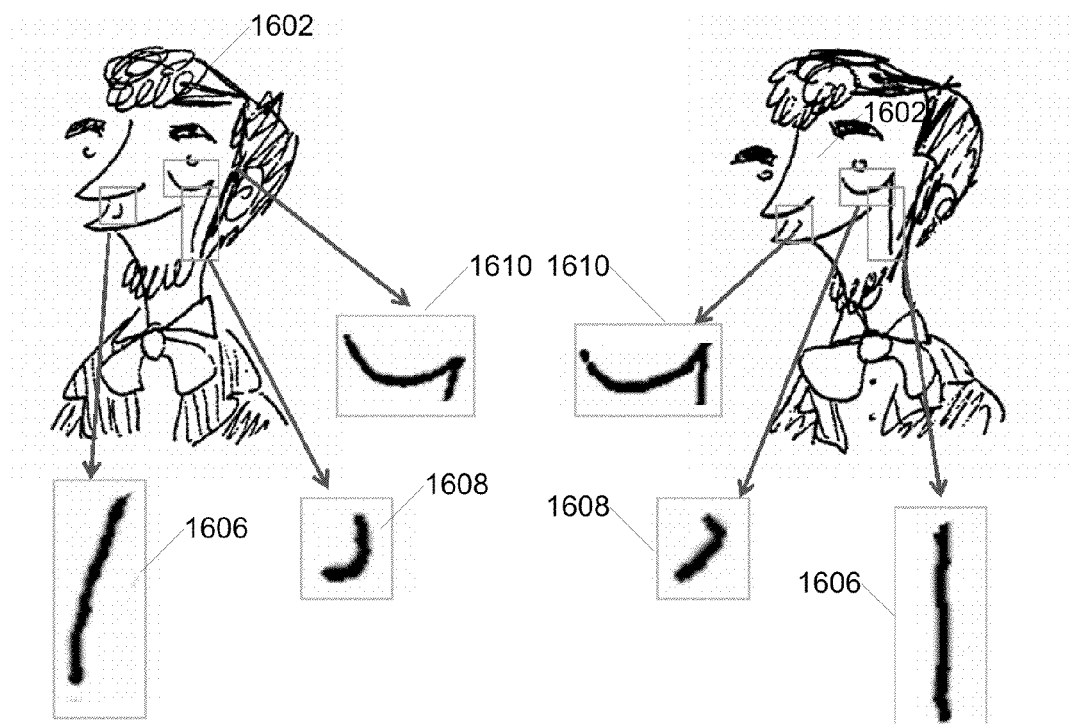

FIGS. 16A and 16B illustrates the concept of embedded sub-graphs common to similar objects. FIG. 16A shows two similar caricatures of Abraham Lincoln 1602 and 1604. They are slightly different as would be expected in photographic imagery. FIG. 16B illustrates some embedded graphs 1606, 1608, and 1610 common to both images 1602 and 1604. Using graph-based methods, these embedded graphs 1606, 1608, and 1610 are the key to recognizing that the two images 1602 and 1604 actually show the same person.

During the training phase 1502, the system is in "learning mode". "Training images," i.e., example images of known objects with associated metadata, are gathered and identified by other means, such as through visual verification by a human being (step 1520). These identified example images are then used to train the system to recognize specific objects of interest by converting the visual characteristics of those objects into graph-based data structures (step 1514); for example, first by extracting graphs (step 1516) and second by extracting features that can be associated with the graphs (step 1518). These graph-based data structures are cataloged and stored in a library (step 1522) that the system can reference at later phases in the process.

Once training to recognize the desired objects is complete, the system enters the identification phase (step 1504). One or more "testing" images, i.e., images of unidentified objects, are provided to the system (step 1524). The system converts the visual characteristics of the image into graph-based data structures using the same or similar methods used during the training phase (step 1526). By comparing (step 1530) the graph-based data structures extracted from the "testing" images to the graph-based data structures stored in the reference library, the system can provide a conjecture (step 1532) as to the identity of the unknown objects shown in the test image. The catalog stores the structural (or topological) information of the graphs, as well as various feature characteristics of the objects from which the graphs were built. The graph topology can be used to establish the basis for comparing objects and the feature characteristics are used to perform the actual comparisons. This two-pass approach is highly accurate, yet computationally efficient.

At the heart of graph-based recognition is the "classification" of graph-based data structures. Classification (step 1212) entails identifying certain graphs and attendant features that truly characterize the object to be recognized. In this context, classification is always performed on isomorphic graphs. The graph topologies—as expressed through the isomorphism—effectively "pre-classify" or "cluster" graphical forms into similar groups in which detailed features can be compared directly. These detailed features are the "fuel" that feeds the classification process.

In general terms, classification is a method that derives a set of features that reliably describes an object and uses these features to determine if an unknown object is similar to known objects. In graph-based recognition, the actual means of classification can be treated as a "plug-in" within the recognition process and can take the form of several known techniques. To date, Linear Discriminant Analysis, Regression Trees, and Neural Networks have been successfully used for classification.

In the case of Linear Discriminant Analysis, an actual set of features is derived and a coefficient assigned to these features during training. Related to these features and coefficients is a measure of an expected result that when computed by multiplying the coefficients by new values extracted from an unknown object will indicate a successful match. This set of features and coefficients is effectively a "kernel" of information to support recognition. When classification is performed, new features are selected from the object being recognized and processed using the coefficients and results contained in the kernel.

Similarly, Regression Trees encompass decisions made of various feature values. As these values are encountered, the trees progress toward "terminal nodes" that contain classification values to be returned by the trees. During training, the trees take their form and when applied to classification, the values that support the various split decisions within the trees are extracted directly from the graph-based feature data.

Neural Networks map a set of outputs to a set of inputs. Again, the graph-based features become the inputs and the identification of a particular class becomes the output.

Figure 17:
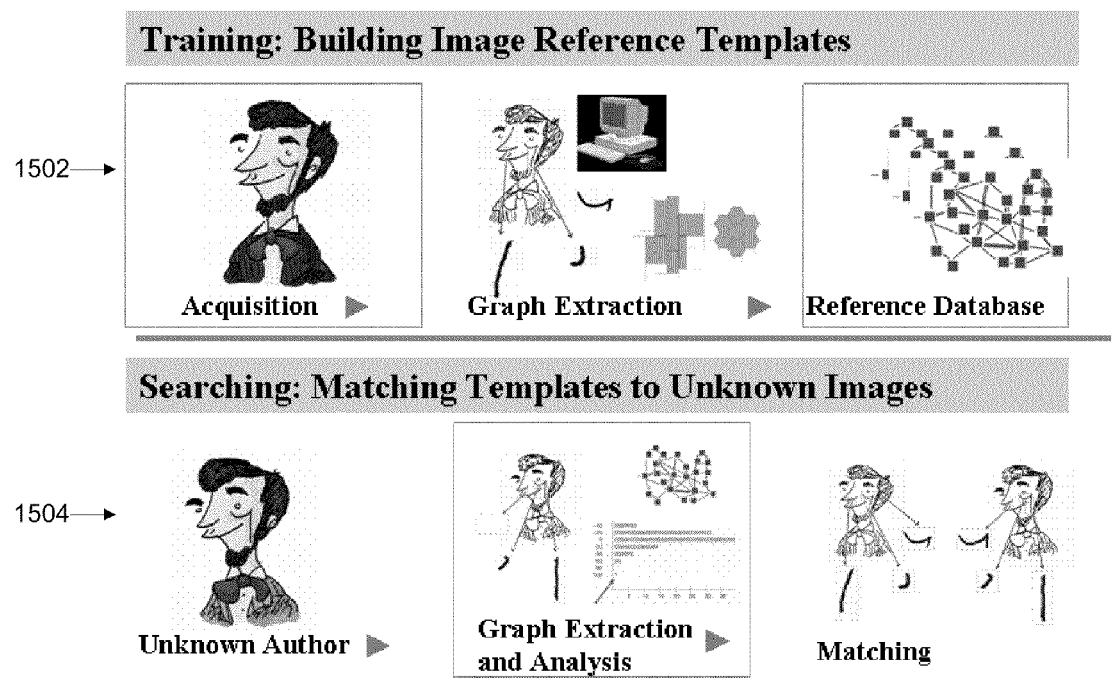
FIG. 17 is diagram illustrating the application of the process of FIG. 15 to the images of FIG. 16.

FIG. 17 is a diagram illustrating the process of FIG. 15 being applied to the images of FIG. 16. In the first track, an image is acquired and converted into graphs. These graphs are analyzed to distill those most characteristic of the image and the resultant templates are stored in a database. Various statistical and other methods, such as neural networks, can be used to derive these templates. The templates can be built from any number of training objects including a single object. If more than one training object is used, the power of statistical methods will be stronger. Once a template is loaded into a database, the database can be used to support searching.

Searching, track 1504, can be accomplished by acquiring images of unknown objects. Each of these images in converted into graphs using the most suitable technique for the image. The graphs are extracted and compared to the templates stored in the database. The database contains multiple graphs representing multiple extracted image features. It is not expected that all graphs from an unknown image will match all graphs from a particular object in the database. However, a "preponderance" of graphs from an unknown image matching a particular template will indicate a strong affinity between the image and the template. This affinity indicates image similarity.

The Graph-based Recognition methods described herein can also be applied to an alternative comparison method in which objects in images are used to generate search queries. In this method, a user selects an image of an object (query object) and requests that the system identify other objects in other images that are similar to the query object. Using the methods outlined above, the query object is converted into graph-based data structures capturing the query object's physical and visual characteristics as topological relationships and associated feature data. The system can then initiate searches for similar objects in one of two ways:

The system can compare the graph information from the query object to the reference libraries, identifying graphs that are suitable matches. A statistical method is then used to consolidate the text-based metadata from the training images into a set of keywords representing the likely content of the image. These keywords can then be used to initiate searches through databases (or the internet) using conventional text-based-query search engines, such as Google.

Alternatively, the system can search through numerous images to identify graphs possessing similar topology and features (query matches). The system then returns to the user the images from which the query matches were generated. This is a powerful tool that allows an automated comparison of the images based directly on the graph-based data structures generated by objects of interest in those images.

The embodiments, described herein, can be practiced with other computer system configurations including hand-held devices, microprocessor systems, microprocessor-based or programmable consumer electronics, minicomputers, mainframe computers and the like. The embodiments can also be practiced in distributing computing environments where tasks are performed by remote processing devices that are linked through a network.

Figure 18:
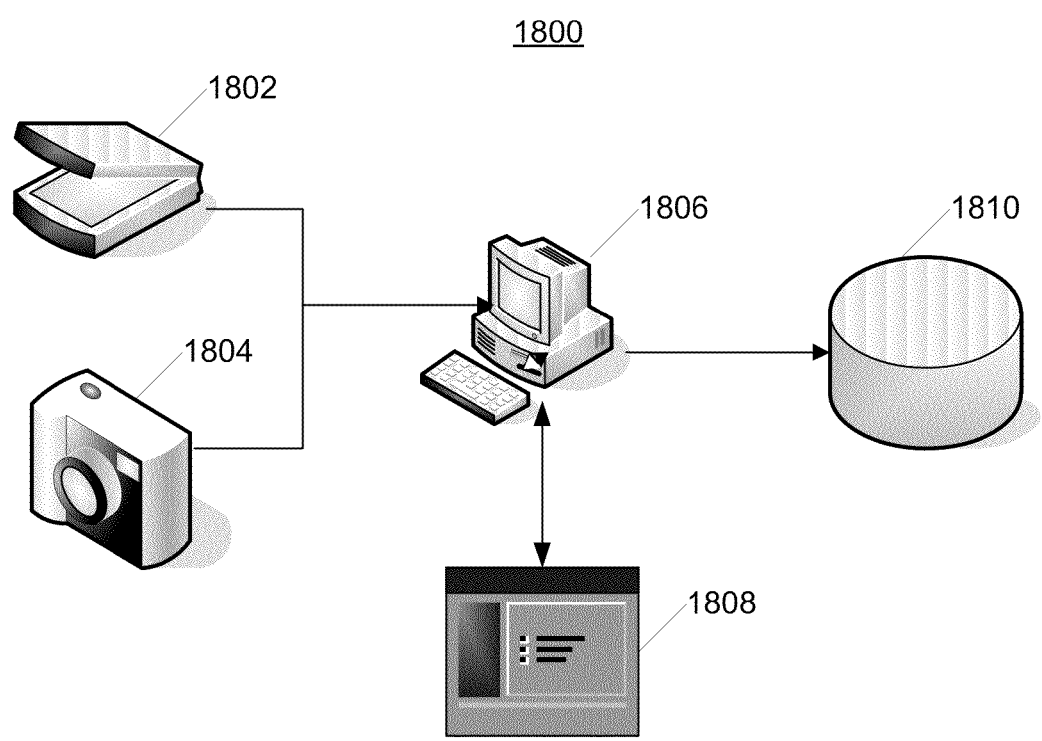
FIG. 18 is a diagram illustrating a system for implementing the process of FIGS. 12 and 15 in accordance with one embodiment.

For example, FIG. 18 is a diagram illustrating an example system that can be configured to implement the processes described above. As can be seen, system 1800 can comprise some mechanism by which images can be input into the system, such as via a scanner 1802 or directly from a data acquisition device 1804. In addition, in certain embodiments, the image may be stored within another system or database and provided to system 1800 via one or more networks. The images provided can be stored in a database 1810. A processor 1806 can then be configured to execute one or more programs 1808 to perform the steps described above.

It will be understood that the term processor is used broadly here to indicate that one or more processors, computers, servers, routers, API's, etc., can be configured to carry out the steps described above. But at the core some processing functionality can be used to implement the steps. For example, it will be understood that complex graphics processors may be needed to manipulate the image data. Moreover, a database server may be required to serve images form database 1810 as needed.

Once the objects and features are extracted from the images and the graph data structures are created, this information can then also be stored in database 1810. It will be understood that database 1810 can be a single database or multiple databases as required by a particular implementation. Further, it will be understood that the components of system 1800 can be co-located or some or all of the components can be located remote form each other.

It should also be understood that the embodiments described herein can employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

Any of the operations that form part of the embodiments described herein are useful machine operations. The invention also relates to a device or an apparatus for performing these operations. The systems and methods described herein can be specially constructed for the required purposes, such as the carrier network discussed above, or it can be a general purpose computer selectively activated or configured by a computer program stored in the computer. In particular, various general purpose machines can be used with computer programs written in accordance with the teachings herein, or it can be more convenient to construct a more specialized apparatus to perform the required operations.

Certain embodiments can also be embodied as computer readable code on a computer readable medium. The computer readable medium is any data storage device that can store data, which can thereafter be read by a computer system. Examples of the computer readable medium include hard drives, network attached storage (NAS), read-only memory, random-access memory, CD-ROMs, CD-Rs, CD-RWs, magnetic tapes, and other optical and non-optical data storage devices. The computer readable medium can also be distributed over a network coupled computer systems so that the computer readable code is stored and executed in a distributed fashion.

Although a few embodiments of the present invention have been described in detail herein, it should be understood, by those of ordinary skill, that the present invention can be embodied in many other specific forms without departing from the spirit or scope of the invention. Therefore, the present examples and embodiments are to be considered as illustrative and not restrictive, and the invention is not to be limited to the details provided therein, but can be modified and practiced within the scope of the appended claims.

The invention claimed is:

1. A method for creating a modeling structure for classifying objects in an image, the method comprising:
generating a library by, using one or more hardware processors, for each of one or more training images,
converting the training image into digital image data,
simplifying the digital image data,
isolating one or more objects in the simplified digital image data, and,
for each of the isolated one or more objects,
creating a graph of the isolated object, the graph comprising vertices and edges,
converting the graph into a representative graph data structure,
generating an isomorphic key based on the vertices and edges of the graph, wherein the isomorphic key identifies a topology of the graph, and
storing the graph data structure such that it can be retrieved using the isomorphic key; and
facilitating a query comprising a search image by, using one or more hardware processors,
converting the search image into digital search image data,
simplifying the digital search image data,
isolating one or more search objects in the simplified digital search image data,
for each of the isolated one or more search objects,
creating a graph of the isolated object, the graph comprising vertices and edges,
generating an isomorphic key based on the vertices and edges of the graph, and
retrieving one or more stored graph data structures based on the isomorphic key,
identifying one or more stored graph data structures that match the isolated one or more search objects from the retrieved one or more stored graph data structures,
retrieving metadata associated with the identified one or more stored graph data structures, and,
based on the retrieved metadata, determining one or more keywords to use in a search.

2. The method of claim 1, wherein each graph data structure includes an object classification.

3. The method of claim 1, further comprising classifying the graph data structures based on a regression tree classifier model.

4. The method of claim 1, further comprising classifying the graph data structures based on a neural network classifier model.

5. The method of claim 1, further comprising classifying the graph data structures based on a discriminant analysis model.

6. The method of claim 1, wherein simplifying the digital image data comprises reducing the image complexity and segmenting one or more foreground objects from a background.

7. The method of claim 6, wherein reducing the image complexity comprises digital signal processing techniques including at least one of the following: Wiener filtering, automatic brightness adjustment, and contrast stretching.

8. The method of claim 6, wherein segmenting includes at least one of the following methods: adaptive thresholding, morphological reconstructions, and ridge detection.

9. The method of claim 6, wherein reducing the image complexity comprises accentuating sharp straight edges and suppressing amorphous objects within the image.

10. The method of claim 1, wherein isolating one or more objects in the simplified image data comprises isolating objects embedded in a larger, more complex image.

11. The method of claim 1, wherein the graph data structure includes intrinsic and extrinsic characteristics of the isolated object.

12. A system for creating a modeling structure for classifying objects in an image, the system comprising:
at least one database;
at least one image input interface configured to receive a digital image; and
one or more processors communicatively coupled with the at least one database and the at least one image input interface, the one or more processors configured to:
generate a library by, for each of one or more training images,
converting the training image into digital image data,
simplifying the digital image data,
isolating one or more objects in the simplified digital image data, and,
for each of the isolated one or more objects,
creating a graph of the isolated object, the graph comprising vertices and edges,
converting the graph into a representative graph data structure,
generating an isomorphic key based on the vertices and edges of the graph, wherein the isomorphic key identifies a topology of the graph, and
storing the graph data structure such that it can be retrieved using the isomorphic key, and
facilitate a query comprising a search image by
converting the search image into digital search image data,
simplifying the digital search image data,
isolating one or more search objects in the simplified digital search image data,
for each of the isolated one or more search objects,
creating a graph of the isolated object, the graph comprising vertices and edges,
generating an isomorphic key based on the vertices and edges of the graph, and
retrieving one or more stored graph data structures based on the isomorphic key,
identifying one or more stored graph data structures that match the isolated one or more search objects from the retrieved one or more stored graph data structures,
retrieving metadata associated with the identified one or more stored graph data structures, and,
based on the retrieved metadata, determining one or more keywords to use in a search.

13. The system of claim 12, wherein each graph data structure includes an object classification.

14. The system of claim 12, wherein the one or more processors are further configured to classify the graph data structures based on a regression tree classifier model.

15. The system of claim 12, wherein the one or more processors are further configured to classify the graph data structures based on a neural network classifier model.

16. The system of claim 12, wherein the one or more processors are further configured to classify the graph data structures based on a discriminant analysis model.

17. The system of claim 12, wherein the one or more processors are configured to simplify the digital image data by reducing the image complexity and segmenting one or more foreground objects from a background.

18. The system of claim 17, wherein reducing the image complexity comprises at least one of the following: Wiener filtering, automatic brightness adjustment, and contrast stretching.

19. The system of claim 17, wherein segmenting includes at least one of the following: adaptive thresholding, morphological reconstructions, and ridge detection.

20. The system of claim 17, wherein reducing the image complexity comprises accentuating sharp straight edges and suppressing amorphous objects within the image.

21. The system of claim 12, wherein isolating one or more objects in the simplified image data comprises isolating objects embedded in a larger more complex image.

22. The system of claim 12, wherein the graph data structure includes intrinsic and extrinsic characteristics of the isolated object.

23. The system of claim 12, wherein the one or more processors are further configured to perform a search using the one or more keywords.

24. The method of claim 1, further comprising performing a search using the one or more keywords.

* * * * *